United States Patent
Agiwal et al.

(10) Patent No.: US 11,206,692 B2
(45) Date of Patent: Dec. 21, 2021

(54) METHOD AND APPARATUS FOR SIGNALING MULTIPLE RESOURCES FOR MESSAGE 3 (MSG3) TRANSMISSIONS

(71) Applicant: Samsung Electronics Co., Ltd., Suwon-si (KR)

(72) Inventors: Anil Agiwal, Suwon-si (KR); Byounghoon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 16/734,631

(22) Filed: Jan. 6, 2020

(65) Prior Publication Data

US 2020/0221505 A1 Jul. 9, 2020

Related U.S. Application Data

(60) Provisional application No. 62/823,895, filed on Mar. 26, 2019, provisional application No. 62/788,395, filed on Jan. 4, 2019.

(51) Int. Cl.
*H04W 74/08* (2009.01)
*H04W 72/14* (2009.01)
(Continued)

(52) U.S. Cl.
CPC ....... *H04W 74/0833* (2013.01); *H04W 24/02* (2013.01); *H04W 72/04* (2013.01); *H04W 72/14* (2013.01)

(58) Field of Classification Search
CPC .. H04W 74/0833; H04W 24/02; H04W 48/10
See application file for complete search history.

(56) References Cited

U.S. PATENT DOCUMENTS

2019/0044678 A1* 2/2019 Liu .................. H04L 5/0098
2019/0281636 A1* 9/2019 Liu .................. H04W 74/0833
(Continued)

FOREIGN PATENT DOCUMENTS

KR 10-2013-0032178 A 4/2013

OTHER PUBLICATIONS

Samsung; Random Access in NR: RAR MAC Subheader Design; 3GPP TSG-RAN WG2 #99bis; R2-1710080 Oct. 9-13, 2017; Prague, Czech Republic.
(Continued)

*Primary Examiner* — Raj Jain
(74) *Attorney, Agent, or Firm* — Jefferson IP Law, LLP

(57) ABSTRACT

A communication method and system for converging a fifth generation (5G) communication system for supporting higher data rates beyond a fourth generation (4G) system with a technology for Internet of things (IoT) are provided. A method of a terminal for performing a random access procedure in this manner includes transmitting a random access preamble to a base station, receiving a random access response (RAR) from the base station, and identifying whether each media access control (MAC) sub-protocol data unit (subPDU) in the received RAR includes a random access preamble identifier (RAPID) corresponding to the random access preamble. The RAR includes a plurality of MAC subPDUs including the RAPID corresponding to the random access preamble.

18 Claims, 35 Drawing Sheets

(51) Int. Cl.
*H04W 72/04* (2009.01)
*H04W 24/02* (2009.01)

(56) References Cited

U.S. PATENT DOCUMENTS

| | | | |
|---|---|---|---|
| 2019/0335512 A1* | 10/2019 | Shi | H04W 74/02 |
| 2019/0349787 A1* | 11/2019 | Kim | H04W 74/00 |
| 2020/0029358 A1* | 1/2020 | Akkarakaran | H04W 74/0833 |
| 2020/0162133 A1* | 5/2020 | Harrison | H04L 25/0226 |
| 2020/0221505 A1* | 7/2020 | Agiwal | H04W 74/0833 |
| 2021/0022187 A1* | 1/2021 | Xu | H04W 74/004 |

OTHER PUBLICATIONS

Motorola Mobility et al.; Modifications to RACH procedure due to LBT; 3GPP TSG RAN WG2 Meeting 104 R2-1816435; Revision of R2-1814438; Nov. 12-16, 2018; Spokane, US.
CMCC; Further consideration on RA-RNTI calculation with respect to the SUL; 3GPP TSG-RAN WG2 Meeting#101; R2-1803211; Resubmission of R2-1800795; Feb. 26-Mar. 3, 2018 ; Athens, Greece.
ZTE et al.; Consideration on the signaling structure for RA; 3GPP TSG-RAN WG2 Meeting #101; R2-1803115 Feb. 26-Mar. 2, 2018; Athens, Greece.
International Search Report with Written Opinion dated Apr. 13, 2020; International Appln. No. PCT/KR2020/000212.
3GPP; 3rd Generation Partnership Project; Technical Specification Group Radio Access Network; NR; Physical layer procedures for data (Release 15); 3GPP TS 38.214; V15.7.0; Sep. 2019; Valbonne, FR.

* cited by examiner

METHOD AND APPARATUS FOR SIGNALING MULTIPLE RESOURCES FOR MESSAGE 3 (MSG3) TRANSMISSIONS

CROSS-REFERENCE TO RELATED APPLICATION(S)

This application is based on and claims priority under 35 U.S.C. § 119(e) of a U.S. Provisional application Ser. No. 62/788,395, filed on Jan. 4, 2019, in the U.S. Patent and Trademark Office, and of a U.S. Provisional application Ser. No. 62/823,895, filed on Mar. 26, 2019, in the U.S. Patent and Trademark Office, the disclosure of each of which is incorporated by reference herein in its entirety.

BACKGROUND

1. Field

The disclosure relates to a method for signaling multiple resources for message 3 (Msg3) transmissions.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System.' The 5G wireless communication system is considered to be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large-scale antenna techniques are being considered in the design of the 5G wireless communication system. In addition, in 5G communication systems, development for system network improvement is under-way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving to the internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth have been recently researched. Such an IoT environment may provide intelligent Internet technology services that create a new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In recent years, several broadband wireless technologies have been developed to meet the growing number of broadband subscribers and to provide more and better applications and services such as these. The second generation (2G) wireless communication system has been developed to provide voice services while ensuring the mobility of users. Third generation (3G) wireless communication system supports the voice service and data service. The 4G wireless communication system has been developed to provide high-speed data service. However, the 4G wireless communication system currently suffers from lack of resources to meet the growing demand for high speed data services. Therefore, the 5G wireless communication system is being developed to meet the growing demand of various services with diverse requirements, e.g., high-speed data services, support ultra-reliability and low-latency applications.

In addition, the 5G wireless communication system is expected to address different use cases having quite different requirements in terms of data rate, latency, reliability, mobility etc. However, it is expected that the design of the air-interface of the 5G wireless communication system will be flexible enough to serve user equipments (UEs) having quite different capabilities depending on the use case and market segment in which the UE caters service to the end customer. Example use cases the 5G wireless communication system is expected to address includes enhanced mobile broadband (eMBB), massive machine type communication (m-MTC), ultra-reliable, low-latency communication (URLL), etc. The eMBB requirements (e.g. tens of Gbps data rate, low-latency, high-mobility, and so on) address the market segment representing the wireless broadband subscribers needing internet connectivity everywhere, all the time and on the go. The m-MTC requirements (e.g., very high connection density, infrequent data transmission, very long battery life, low mobility address and so on) address the market segment representing the IoT/IoE envisioning connectivity of billions of devices. The URLL requirements (e.g., very low latency, very high reliability variable mobility, and so forth) address the market segment representing the Industrial automation application and vehicle-to-vehicle/vehicle-to-infrastructure communication that is foreseen as one of the enablers for autonomous cars.

The current design of 5G wireless communication system is for operation on licensed carrier(s). A study has been initiated recently to study enhancements to 5G wireless communication system for operation on unlicensed carrier(s). The main motivation of using unlicensed carrier is capital expenditures (CAPEX) reduction for cellular operators by utilizing free spectrum access for intelligent data offloading; improved and intelligent spectrum access and management, to address increasing wireless traffic demand under limited available spectrum and allowing network operators without licensed spectrum to utilize the radio efficient 3rd generation partnership project (3GPP) radio access technology. Various deployment scenarios are being considered for operation on unlicensed carrier(s) such as:

New radio-unlicensed (NR-U) licensed assisted access (LAA): Carrier aggregation between licensed band NR (primary cell (PCell)) and unlicensed band NR-U (secondary cell (SCell));

NR-U stand-alone (SA): Stand-alone NR-U;

LTE NR unlicensed-dual connectivity (ENU-DC): Dual connectivity between licensed band LTE (PCell) and unlicensed band NR-U (primary SCell (PSCell)); and NR unlicensed-dual connectivity (NNU-DC): Dual connectivity between licensed band NR (PCell) and unlicensed band NR-U (PSCell).

Note that the scenarios above include an NR cell with downlink (DL) in unlicensed band and uplink (UL) in licensed band.

One of the goals of the above study is to identify enhancements needed to support random access (RA) procedure in unlicensed band. In the 5G (also referred as NR or New Radio) wireless communication system, RA procedure is used to achieve UL time synchronization. RA procedure is used during initial access, handover, radio resource control (RRC) connection re-establishment procedure, scheduling request transmission, secondary cell group (SCG) addition/modification and data or control information transmission in UL by non-synchronized user equipment (UE) in RRC CONNECTED state. During the RA procedure, the UE first transmits RA preamble (also referred as message 1 (Msg1)) and then waits for RA response (RAR) or message 2 (Msg2) in the RAR window corresponding to its RA preamble transmission. Next generation node B (gNB) transmits the RAR on physical DL shared channel (PDSCH) addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The maximum size of RAR-window is one radio frame, i.e. 10 ms. The RA-RNTI is calculated as follows: RA-RNTI=1+s_id+14*t_id+14*80*f_id+14*80*8*ul_carrier_id, where:

s_id is the index of the first orthogonal frequency division multiplexing (OFDM) symbol of the PRACH occasion where UE has transmitted Msg1, i.e. RA preamble; 0≤s_id<14, t_id is the index of the first slot of the PRACH occasion (0<t_id<80), f_id is the index of the PRACH occasion within the slot in the frequency domain (0<f_id<8), and ul_carrier_id is the UL carrier used for Msg1 transmission (0 for normal UL (NUL) carrier and 1 for supplementary UL (SUL) carrier.

Several RARs for various RA preambles detected by gNB can be multiplexed in the same RAR media access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE retransmits the RA preamble.

If the RAR corresponding to its RA preamble transmission is received and UE has transmitted a dedicated RA preamble, RA procedure is considered successful. If the UE has transmitted a non-dedicated (i.e. contention based) RA preamble then upon successful reception of RAR, the UE transmits message 3 (Msg3) in UL grant received in RAR. Msg3 includes message such as RRC connection request, RRC connection re-establishment request, RRC handover confirm, scheduling request, etc. It also includes the UE identity (i.e. cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if the UE receives a physical downlink control channel (PDCCH) addressed to C-RNTI included in Msg3, contention resolution is considered successful, contention resolution timer is stopped and RA procedure is completed. While the contention resolution timer is running, if the UE receives contention resolution MAC CE including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, the UE retransmits the RA preamble.

The cell on which UE transmits RA preamble can be a licensed carrier or unlicensed carrier. In case carrier used for UL transmission is unlicensed carrier, the UE needs to perform channel sensing (i.e. listen-before-talk (LBT)) to determine whether channel is free or not before transmitting Msg3 in the UL. In order to alleviate the impact of LBT failures, additional opportunities (e.g. in time or frequency domain) for Msg3 messages are being considered. One of the simplest approaches is to transmit multiple RARs in RAR window.

FIG. 1 shows signaling flows between a UE and a gNB according to the related art.

UL grant received in each successfully RAR is considered as a valid UL grant for Msg3 transmission. However, this is not efficient and leads to excessive signaling (multiple RAR MAC PDUs, multiple PDCCHs to schedule these RARs). Also note that because of LBT in DL, network may not be able to transmit multiple RARs in RAR window. An efficient method of signaling is needed.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

Additional aspects will be set forth in part in the description which follows and, in part, will be apparent from the description, or may be learned by practice of the presented embodiments.

In accordance with an aspect of the disclosure, a method of a terminal for performing a random access procedure is provided. The method includes transmitting a random access preamble to a base station, receiving a random access response (RAR) from the base station, and identifying whether each media access control (MAC) sub-protocol data unit (subPDU) in the received RAR includes a random access preamble identifier (RAPID) corresponding to the random access preamble. The RAR comprises a plurality of MAC subPDUs including the RAPID corresponding to the random access preamble.

In accordance with another aspect of the disclosure, a terminal in a wireless communication system is provided. The terminal comprises a transceiver and at least one processor coupled with the transceiver. The at least one processor is configured to transmit a random access preamble to a base station via the transceiver, receive an RAR from the base station via the transceiver, and identify whether each MAC subPDU in the received RAR includes an RAPID corresponding to the random access preamble. The RAR comprises a plurality of MAC subPDUs including the RAPID corresponding to the random access preamble.

In accordance with another aspect of the disclosure, a method of a base station for performing a random access procedure is provided. The method includes receiving a random access preamble from a terminal, generating an RAR including a plurality of MAC subPDUs, and transmitting the generated RAR to the terminal. The plurality of MAC subPDUs comprise an RAPID corresponding to the random access preamble.

In accordance with another aspect of the disclosure, a base station in a wireless communication system is provided. The base station includes a transceiver and at least one processor coupled with the transceiver. The at least one processor is configured to receive a random access preamble from a terminal via the transceiver, generate an RAR comprising a plurality of MAC subPDUs, and transmit the generated RAR to the terminal via the transceiver. The plurality of MAC subPDUs comprise an RAPID corresponding to the random access preamble.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
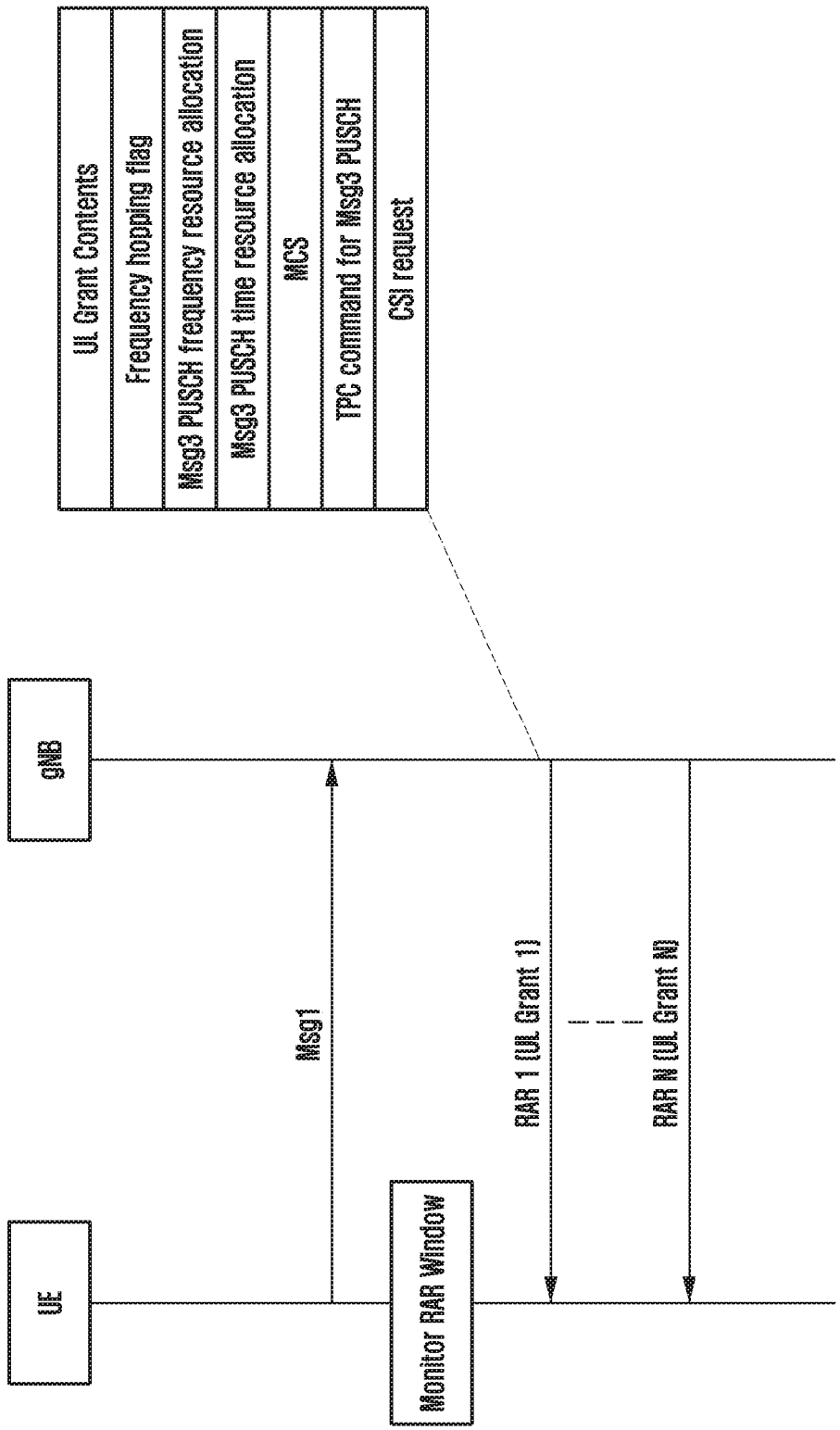
FIG. 1 shows signaling flows between a user equipment (UE) and a next generation node B (gNB) according to the related art.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general-purpose computer, special-purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A base station (BS) is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A UE is an entity communicating with a BS and may be referred to as a UE, a device, a mobile station (MS), a mobile equipment (ME), or a terminal.

Signaling Multiple Physical Uplink Shared Channel (PUSCH) Resources for Message 3 (Msg3)

Figure 2:
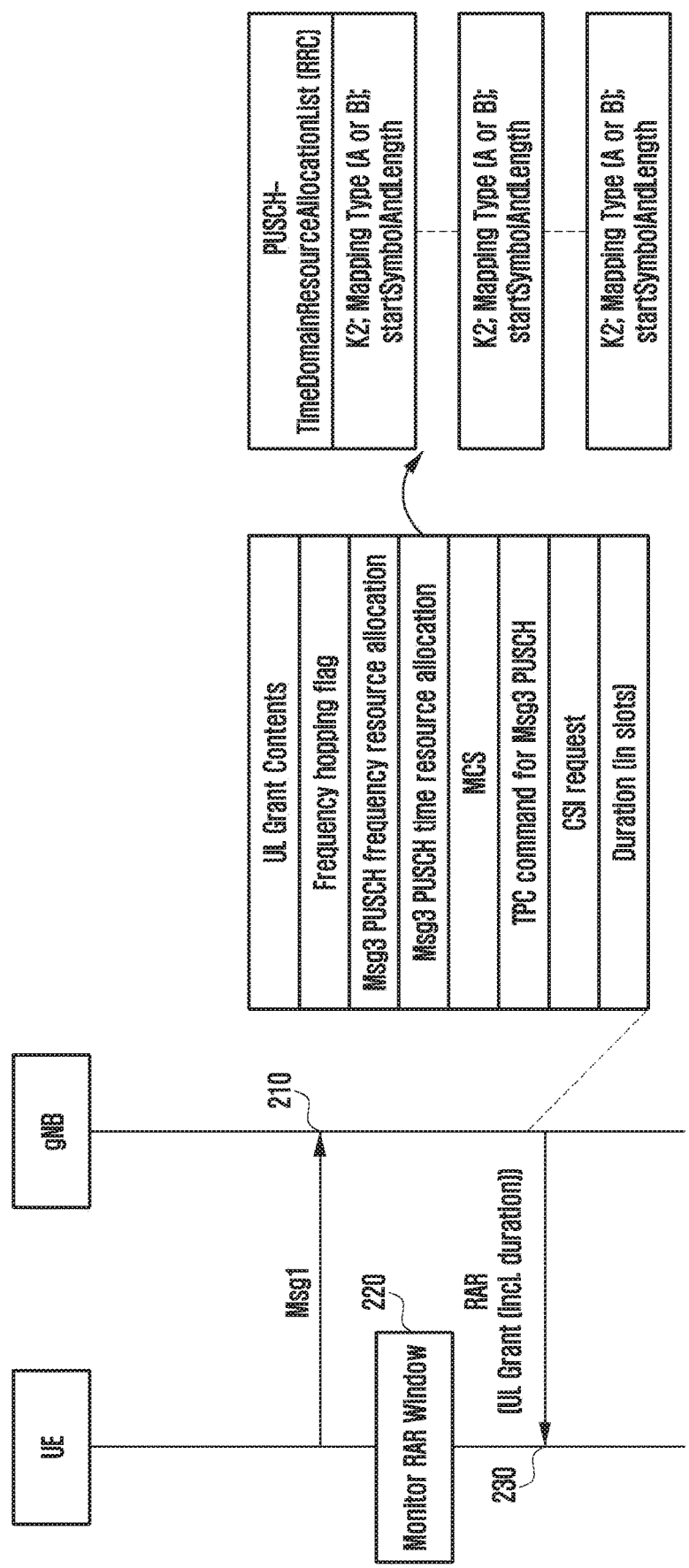
FIG. 2 shows signaling flows between a UE and a gNB according to an embodiment of the disclosure.

Method 1:

FIG. 2 shows signaling flows between a UE and a gNB according to an embodiment of the disclosure.

Referring to FIG. 2, after a UE transmits a message 1 (Msg1) to a gNB at operation 210, the UE monitors a random access response (RAR) window at operation 220. The gNB transmits uplink (UL) grant in an RAR (or message 2 (Msg2)) at operation 230. The UL grant may include at least one of information on frequency hopping flag, Msg3 PUSCH frequency resource allocation, Msg3 PUSCH time resource allocation, modulation and coding scheme (MCS), transmission power control (TPC) command for Msg3 PUSCH, or channel state information (CSI) request. A new parameter 'duration' is also included in UL grant contents. The value of parameter 'duration' is in slots. The length of slot is determined based on Msg3 sub-carrier spacing (SCS). Msg3 SCS is signaled by gNB. The length of slot for various SCSs is pre-defined.

Figure 3:
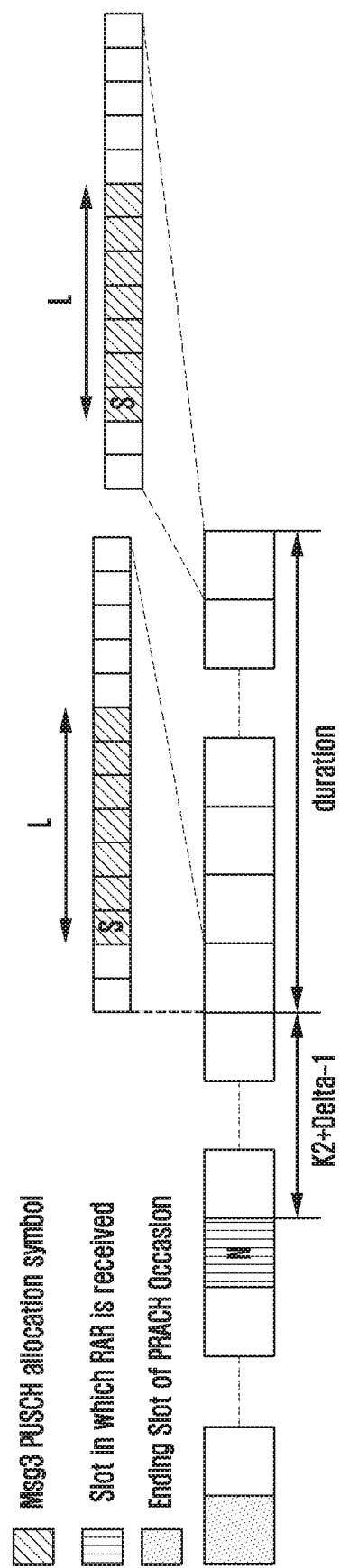
FIG. 3 shows an example where multiple physical uplink shared channel (PUSCH) resources for Msg3 are signaled according to an embodiment of the disclosure.

FIG. 3 shows an example where multiple PUSCH resources for Msg3 are signaled according to an embodiment of the disclosure.

Referring to FIG. 3, RAR is received in nth slot of RAR window wherein the slot length is according to SCS for RAR (i.e. SCS for physical downlink control channel (PDCCH) reception for RAR). In this method, the 'duration' starts from slot 'N+$K_2$+Delta' where N=n*($2^{scs\_msg3}/2^{scs\_rar}$). Delta is specific to Msg3 SCS and is pre-defined for each SCS. $K_2$ is indicated by 'Msg3 PUSCH time resource allocation' field in UL grant.

In this method, PUSCH resource is there in each slot of 'duration' slots. The PUSCH resource in a slot among 'duration' slots, starts at symbol S and consists of L consecutive symbols. S and L are the same for PUSCH resources in 'duration' slots and are indicated by parameter 'Msg3 PUSCH time resource allocation' in UL grant.

An 'Msg3 PUSCH time resource allocation' field value m indicates a row index m+1 to the list PUSCH-TimeDomain- ResourceAllocationList signaled by radio resource control (RRC) (dedicated signaling or system information (SI)). The indexed row defines the slot offset $K_2$, the start and length indicator SLIV, and the PUSCH mapping type to be applied in the PUSCH transmission. The starting symbol S relative to the start of the slot, and the number of consecutive symbols L counting from the symbol S allocated for the PUSCH are determined from the start and length indicator SLIV of the indexed row as defined in 3GPP TS 38.214.

The PRBs for PUSCH resource are same for all PUSCH resources in 'duration' slots and are indicated by parameter 'Msg3 PUSCH frequency resource allocation'. The starting PRB and length in PRBs of PUSCH resource are determined using the parameter 'Msg3 PUSCH frequency resource allocation' as defined in 3GPP TS 38.214.

In an alternate embodiment of this method, the parameter 'duration' can be signaled in random access channel (RACH) configuration instead of UL grant contents. RACH configuration is signaled by gNB in SI or dedicated RRC signaling.

In an alternate embodiment of this method, the parameter 'duration' can be signaled in PUSCH-TimeDomainResourceAllocation information element (IE) of PUSCH-TimeDomainResourceAllocation list signaled by RRC (dedicated signaling or SI) instead of UL grant contents.

In an alternate embodiment of this method, instead of parameter 'duration,' number of PUSCH resources can be signaled. In this case, duration in above description is equal to 'number of PUSCH resources'.

In this method, each slot among the 'duration' slots has PUSCH resource for Msg3. The UE will transmit Msg3 in PUSCH resource in one of these slots where listen before talk (LBT) is successful. The UE may transmit Msg3 in earliest PUSCH resource where LBT is successful.

Figure 4:
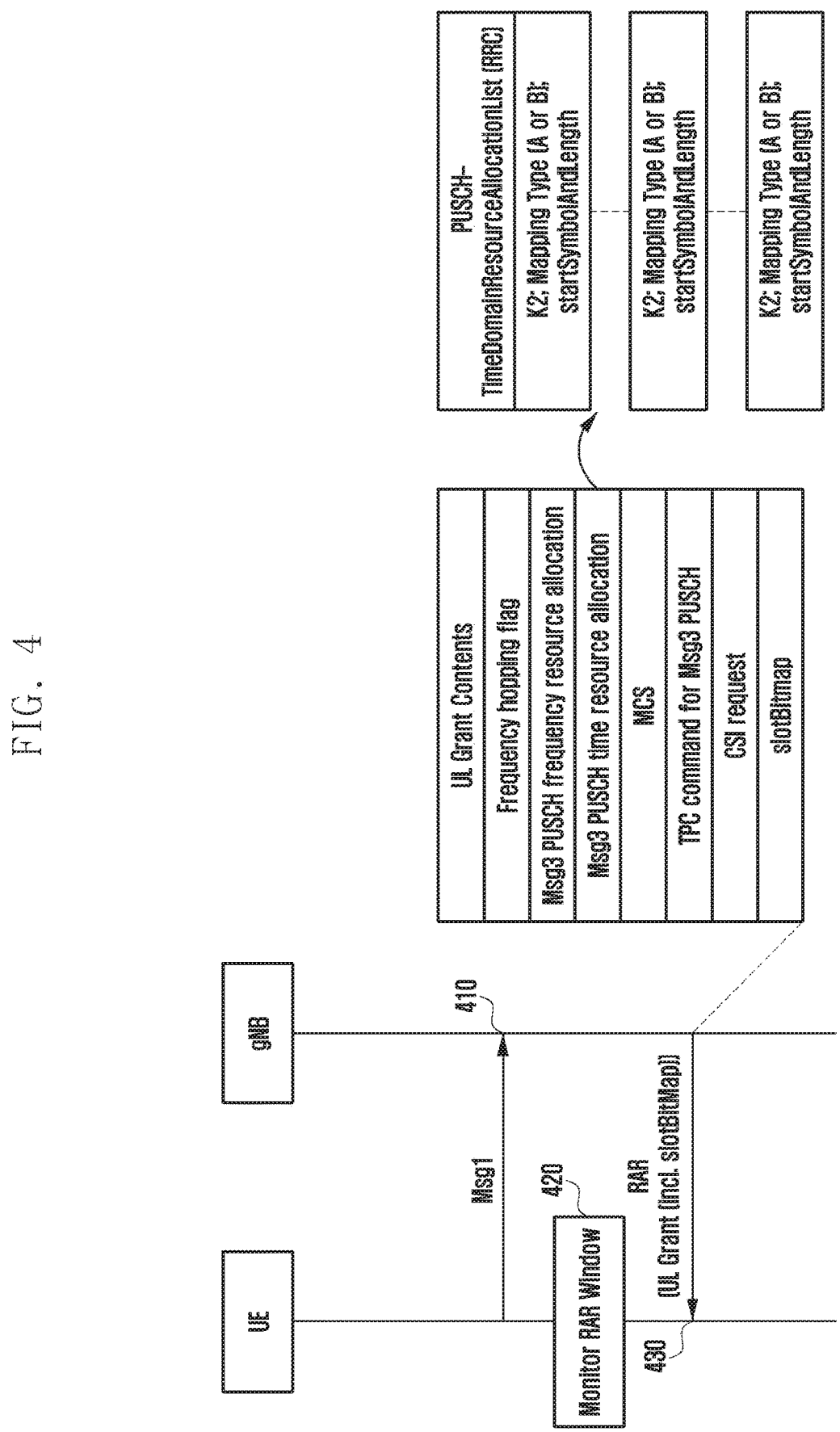
FIG. 4 shows signaling flows between a UE and a gNB according to an embodiment of the disclosure.

Method 2:

FIG. 4 shows signaling flows between a UE and a gNB according to an embodiment of the disclosure.

Referring to FIG. 4, after a UE transmits a Msg1 to a gNB at operation 410, the UE monitors an RAR window at operation 420. The gNB transmits UL grant in an RAR (or Msg2) at operation 430. The UL grant may include at least one of information on frequency hopping flag, Msg3 PUSCH frequency resource allocation, Msg3 PUSCH time resource allocation, MCS, TPC command for Msg3 PUSCH, or CSI request. A new parameter 'slotBitmap' is also included in UL grant contents.

Figure 5:
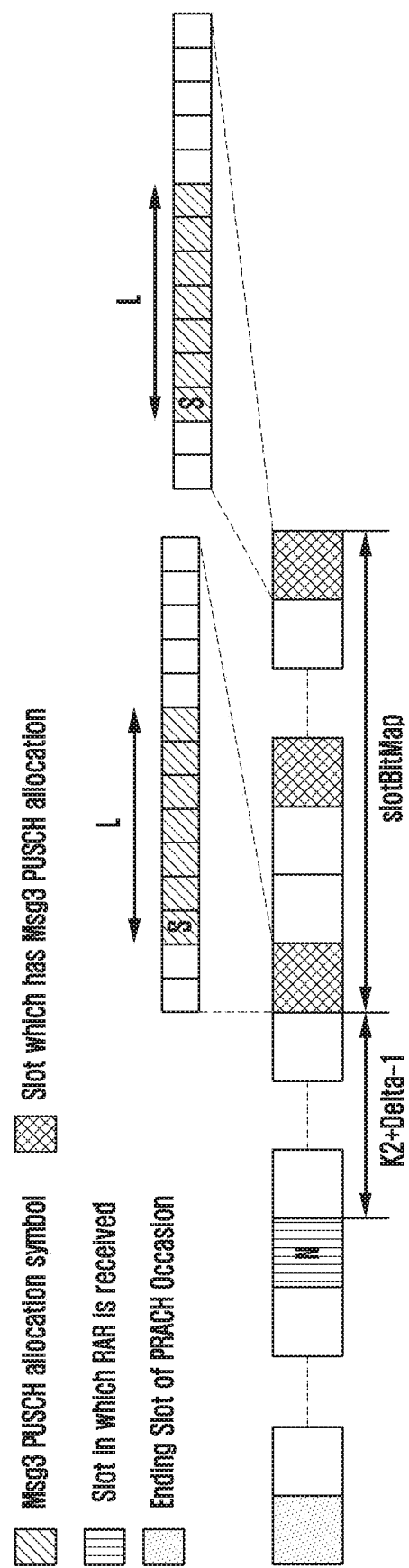
FIG. 5 shows an example where multiple PUSCH resources for Msg3 are signaled according to an embodiment of the disclosure.

FIG. 5 shows an example where multiple PUSCH resources for Msg3 are signaled according to an embodiment of the disclosure.

Referring to FIG. 5, RAR is received in nth slot of RAR window wherein the slot length is according to SCS for RAR (i.e. SCS for PDCCH reception for RAR). The 'slotBitmap' starts from slot 'N+$K_2$+Delta' where N=n*($2^{scs\_msg3}$/$2^{scs\_rar}$) where length of slot is according to Msg3 SCS. The first/left most bit of 'slotBitmap' corresponds to slot 'N+$K_2$+Delta'. The second bit of 'slotBitmap' corresponds to slot 'N+$K_2$+Delta+1'. The third bit of 'slotBitmap' corresponds to slot 'N+$K_2$+Delta+2' and so on. Delta is specific to Msg3 SCS and is pre-defined for each SCS. $K_2$ is indicated by 'Msg3 PUSCH time resource allocation' field in UL grant. The length of slots corresponding to bits in 'slotBitmap' is determined based on Msg3 SCS.

In this method, if the bit corresponding to a slot in 'slotBitmap' is set to 1, then that slot has PUSCH resource for Msg3. If multiple slots have PUSCH resource, the UE will transmit Msg3 in PUSCH resource in one of these slots. The UE will transmit Msg3 in a slot having PUSCH resource for Msg3 if LBT is successful. The UE may transmit Msg3 in earliest PUSCH resource where LBT is successful.

If a slot has PUSCH resource, it starts at symbol S and consists of L consecutive symbols. S and L are the same for PUSCH resources in any slot for which the bit corresponding to that slot in 'slotBitmap' is set to 1 and are indicated by parameter 'Msg3 PUSCH time resource allocation' in UL grant.

An 'Msg3 PUSCH time resource allocation' field value m indicates a row index m+1 to the list PUSCH-TimeDomainResourceAllocationList signaled by RRC (dedicated signaling or SI). The indexed row defines the slot offset $K_2$, the start and length indicator SLIV, and the PUSCH mapping type to be applied in the PUSCH transmission. The starting symbol S relative to the start of the slot, and the number of consecutive symbols L counting from the symbol S allocated for the PUSCH are determined from the start and length indicator SLIV of the indexed row as defined in 3GPP TS 38.214.

The PRBs for PUSCH resource are same for PUSCH resources in any slot for which the bit corresponding to that slot in 'slotBitmap' is set to 1 and are indicated by parameter 'Msg3 PUSCH frequency resource allocation'. The starting PRB and length in PRBs of PUSCH resource are determined using the parameter 'Msg3 PUSCH frequency resource allocation' as defined in 3GPP TS 38.214.

In an alternate embodiment of this method, the parameter 'slotBitmap' can be signaled in RACH configuration instead of UL grant contents. RACH configuration is signaled by gNB in SI or dedicated RRC signaling.

In an alternate embodiment of this method, the parameter 'slotBitmap' can be signaled in PUSCH-TimeDomainResourceAllocation IE of PUSCH-TimeDomainResourceAllocation list signaled by RRC (dedicated signaling or SI) instead of UL grant contents.

Figure 6:
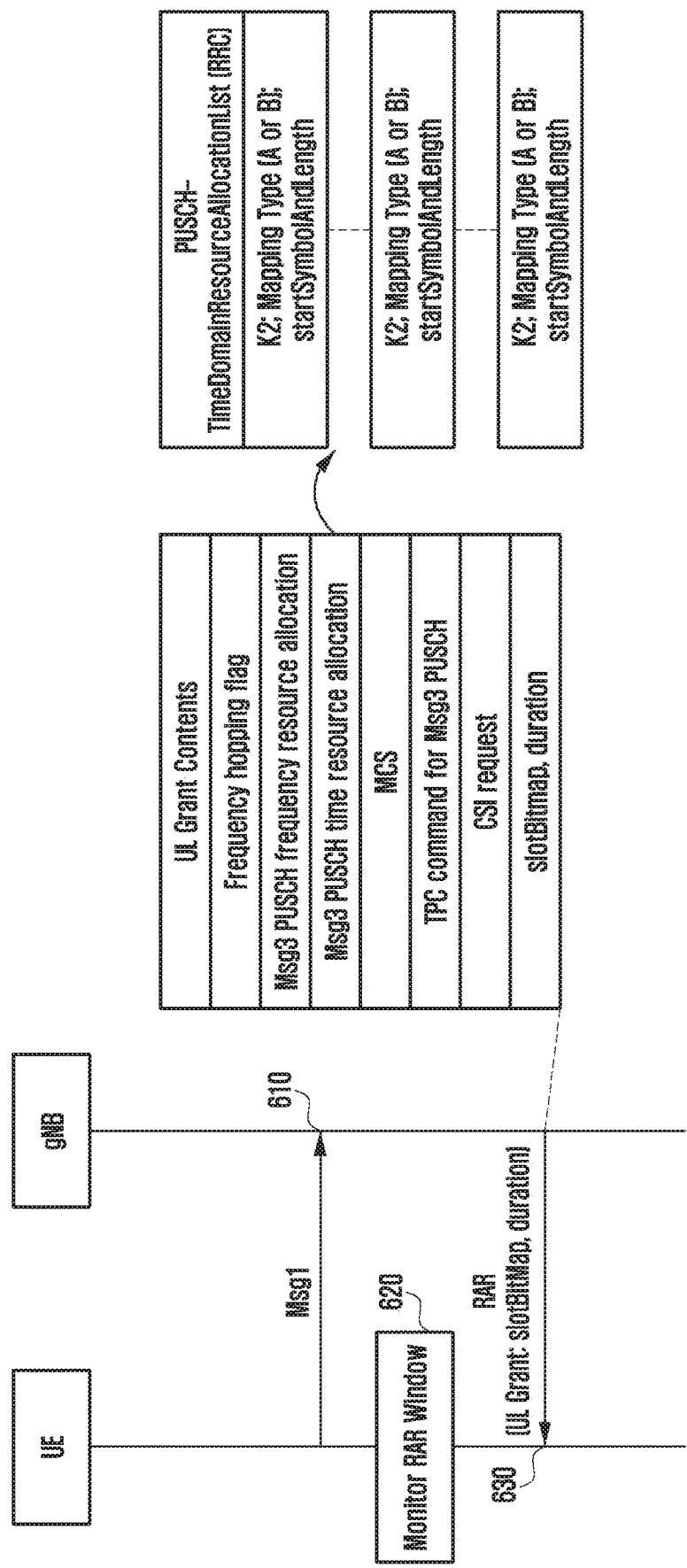
FIG. 6 shows signaling flows between a UE and a gNB according to an embodiment of the disclosure.

Method 3:

FIG. 6 shows signaling flows between a UE and a gNB according to an embodiment of the disclosure.

Referring to FIG. 6, after a UE transmits a Msg1 to a gNB at operation 610, the UE monitors an RAR window at operation 620. The gNB transmits UL grant in an RAR (or Msg2) at operation 630. The UL grant may include at least one of information on frequency hopping flag, Msg3 PUSCH frequency resource allocation, Msg3 PUSCH time resource allocation, MCS, TPC command for Msg3 PUSCH, or CSI request. New parameters 'slotBitmap' and 'duration' are also included in UL grant contents. The 'duration' is in slots. The length of each slot of 'duration' is determined based on Msg3 SCS.

Figure 7:
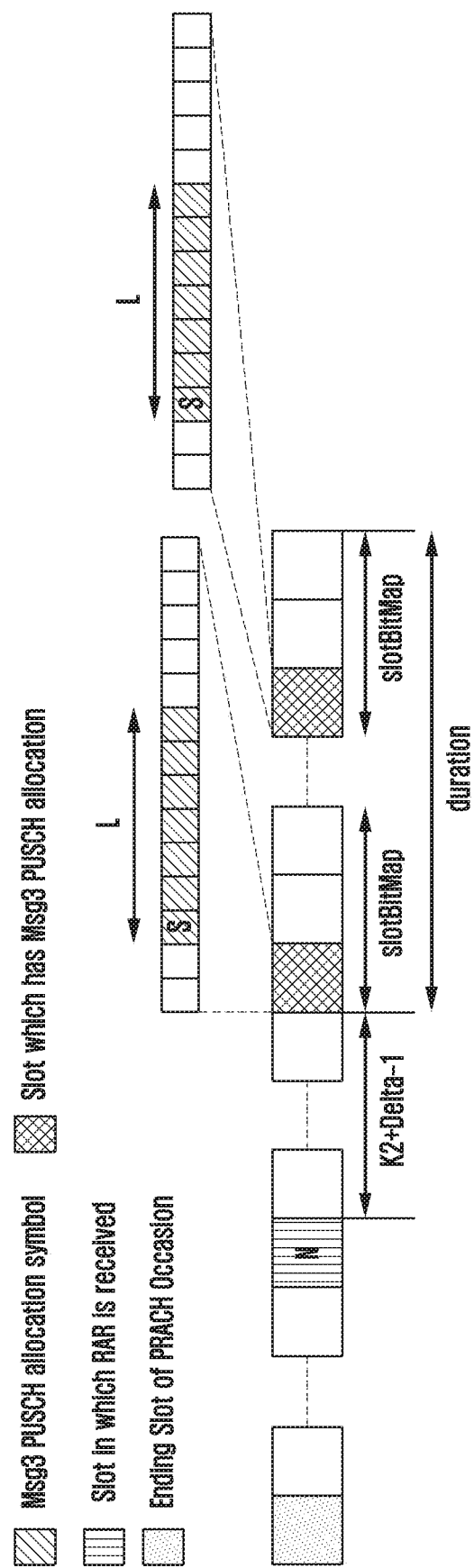
FIG. 7 shows an example where multiple PUSCH resources for Msg3 are signaled according to an embodiment of the disclosure.

FIG. 7 shows an example where multiple PUSCH resources for Msg3 are signaled according to an embodiment of the disclosure.

Referring to FIG. 7, RAR is received in nth slot of RAR window wherein the slot length is according to SCS for RAR (i.e. SCS for PDCCH reception for RAR). The 'slotBitmap' starts from slot 'N+$K_2$+Delta' where N=n*($2^{scs\_msg3}$/$2^{scs\_rar}$) where length of slot is according to Msg3 SCS. The first/left most bit of 'slotBitmap' corresponds to slot 'N+$K_2$+Delta'. The second bit of 'slotBitmap' corresponds to slot 'N+$K_2$+Delta+1'. The third bit of 'slotBitmap' corresponds to slot 'N+$K_2$+Delta+2' and so on. Delta is specific to Msg3 SCS and is pre-defined for each SCS. $K_2$ is indicated by 'Msg3 PUSCH time resource allocation' field in UL grant. The length of slots corresponding to bits in 'slotBitmap' is determined based on Msg3 SCS.

The 'slotBitmap' is repeatedly applied until the end of 'duration' slots. For example, if the length of 'slotBitmap' is 10 bits and the length of 'duration' is 30 slots, 'slotBitmap' is applied to slots N+K2+Delta to N+K2+Delta+9, N+K2+Delta+10 to N+K2+Delta+19, and N+K2+Delta+20 to N+K2+Delta+29. For example, if 'slotBitMap' equals 1100000000:

Slots N+K2+Delta and N+K2+Delta+1 have PUSCH resource. Slots N+K2+Delta+2 to N+K2+Delta+9 do not have PUSCH resource.

Slots N+K2+Delta+10 and N+K2+Delta+11 have PUSCH resource. Slots N+K2+Delta+12 to N+K2+Delta+19 do not have PUSCH resource.

Slots N+K2+Delta+20 and N+K2+Delta+21 have PUSCH resource. Slots N+K2+Delta+22 to N+K2+Delta+29 do not have PUSCH resource.

In this method, if the bit corresponding to a slot in 'slotBitmap' is set to 1, then that slot has PUSCH resource for Msg3. If multiple slots have PUSCH resource, the UE will transmit Msg3 in PUSCH resource in one of these slots where LBT is successful. The UE may transmit Msg3 in earliest PUSCH resource where LBT is successful. If a slot has PUSCH resource, it starts at symbol S and consists of L consecutive symbols. S and L are the same for PUSCH resources in any slot for which the bit corresponding to that slot in 'slotBitmap' is set to 1 and are indicated by parameter 'Msg3 PUSCH time resource allocation' in UL grant.

An 'Msg3 PUSCH time resource allocation' field value m indicates a row index m+1 to the list PUSCH-TimeDomainResourceAllocationList signaled by RRC (dedicated signaling or SI). The indexed row defines the slot offset $K_2$, the start and length indicator SLIV, and the PUSCH mapping type to be applied in the PUSCH transmission. The starting symbol S relative to the start of the slot, and the number of consecutive symbols L counting from the symbol S allocated for the PUSCH are determined from the start and length indicator SLIV of the indexed row as defined in 3GPP TS 38.214.

The PRBs for PUSCH resource are same for PUSCH resources in any slot for which the bit corresponding to that slot in 'slotBitmap' is set to 1 and are indicated by parameter 'Msg3 PUSCH frequency resource allocation'. The starting PRB and length in PRBs of PUSCH resource are determined using the parameter 'Msg3 PUSCH frequency resource allocation' as defined in 3GPP TS 38.214.

In an alternate embodiment of this method, the parameter 'slotBitmap' and/or 'duration' can be signaled in RACH configuration instead of UL grant contents. RACH configuration is signaled by gNB in SI or dedicated RRC signaling.

In an alternate embodiment of this method, the parameter 'slotBitmap' and/or 'duration' can be signaled in PUSCH-TimeDomainResourceAllocation IE of PUSCH-TimeDomainResourceAllocation list signaled by RRC (dedicated signaling or SI) instead of UL grant contents.

In an embodiment, one of these parameters (slotBitmap' and 'duration') can be signaled in in PUSCH-TimeDomainResourceAllocation IE of PUSCH-TimeDomainResourceAllocation list signaled by RRC (dedicated signaling or SI) and another can be signaled in RAR.

In an alternate embodiment, instead of 'duration', 'num repetition' can be signaled. 'slotBitmap' is repeated 'num repetion' times. For example, if the length of 'slotBitmap' is 10 bits and the 'num repetition' is 3, bits of 'slotBitmap' corresponds to slots N+K2+Delta to N+K2+Delta+9, N+K2+Delta+10 to N+K2+Delta+19, and N+K2+Delta+20 to N+K2+Delta+29. For example, if 'slotBitMap' equals 1100000000:

Slots N+K2+Delta and N+K2+Delta+1 have PUSCH resource. Slots N+K2+Delta+2 to N+K2+Delta+9 do not have PUSCH resource.

Slots N+K2+Delta+10 and N+K2+Delta+11 have PUSCH resource. Slots N+K2+Delta+12 to N+K2+Delta+19 do not have PUSCH resource.

Slots N+K2+Delta+20 and N+K2+Delta+21 have PUSCH resource. Slots N+K2+Delta+22 to N+K2+Delta+29 do not have PUSCH resource.

In an alternate embodiment, instead of 'duration', 'num of PUSCH resources' can be signaled. In this case, duration is equal to 'num of PUSCH resources'/(number of bits set to 1 in slotBitmap*size of slotBitmap).

Figure 8:
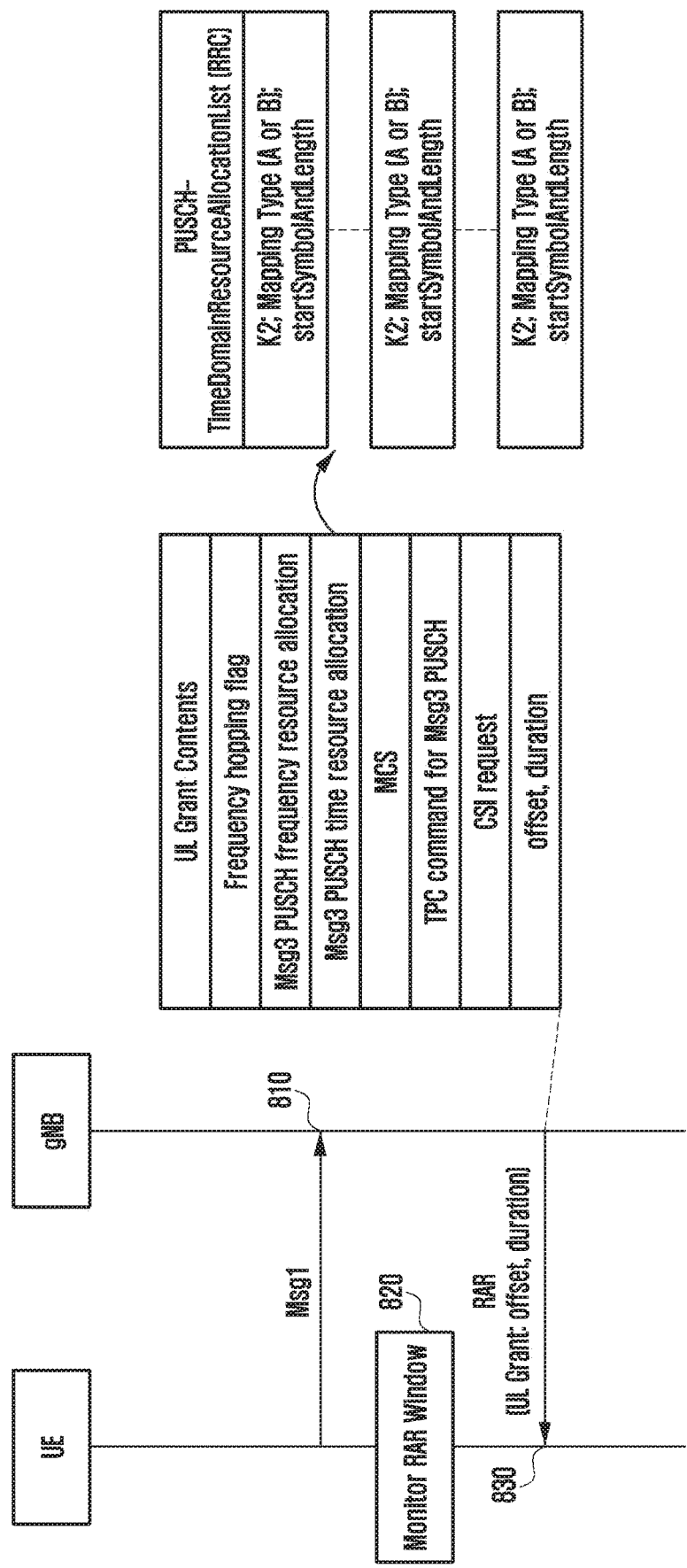
FIG. 8 shows signaling flows between a UE and a gNB according to an embodiment of the disclosure.

Method 4:

FIG. 8 shows signaling flows between a UE and a gNB according to an embodiment of the disclosure.

Referring to FIG. 8, after a UE transmits a Msg1 to a gNB at operation 810, the UE monitors an RAR window at operation 820. The gNB transmits UL grant in an RAR (or Msg2) at operation 830. The UL grant may include at least one of information on frequency hopping flag, Msg3 PUSCH frequency resource allocation, Msg3 PUSCH time resource allocation, MCS, TPC command for Msg3 PUSCH, or CSI request. New parameters 'offset' and 'duration' are also included in UL grant contents. The values of these parameters are in slots wherein the length of slot is determined based on Msg3 SCS. Msg3 SCS is signaled by gNB. The length of slot for various SCSs is pre-defined.

Figure 9:
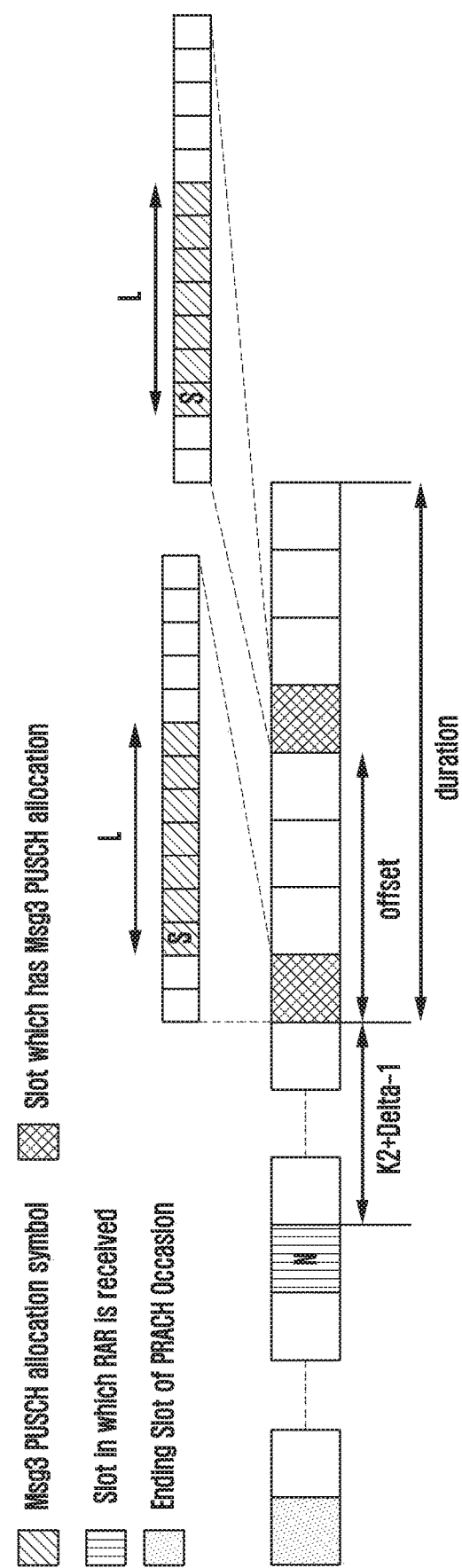
FIG. 9 shows an example where multiple PUSCH resources for Msg3 are signaled according to an embodiment of the disclosure.

FIG. 9 shows an example where multiple PUSCH resources for Msg3 are signaled according to an embodiment of the disclosure.

Referring to FIG. 9, RAR is received in nth slot of RAR window wherein the slot length is according to SCS for RAR (i.e. SCS for PDCCH reception for RAR). In this method, the 'duration' starts from slot 'N+$K_2$+Delta' where N=n* $(2^{scs\_msg3}/2^{scs\_rar})$. Delta is specific to Msg3 SCS and is pre-defined for each SCS. $K_2$ is indicated by 'Msg3 PUSCH time resource allocation' field in UL grant.

In this method, PUSCH resource is there in slot 'N+$K_2$+Delta', slot 'N+$K_2$+Delta+offset', slot 'N+$K_2$+Delta+2*offset, slot 'N+$K_2$+Delta+3*offset, . . . , slot 'N+$K_2$+Delta+(i−1)*offset where i=duration/offset. In a slot having PUSCH resource, PUSCH resource starts at symbol S and consists of L consecutive symbols. S and L are the same for PUSCH resources in 'duration' slots and are indicated by parameter 'Msg3 PUSCH time resource allocation' in UL grant.

An 'Msg3 PUSCH time resource allocation' field value m indicates a row index m+1 to the list PUSCH-TimeDomainResourceAllocationList signaled by RRC (dedicated signaling or SI). The indexed row defines the slot offset $K_2$, the start and length indicator SLIV, and the PUSCH mapping type to be applied in the PUSCH transmission. The starting symbol S relative to the start of the slot, and the number of consecutive symbols L counting from the symbol S allocated for the PUSCH are determined from the start and length indicator SLIV of the indexed row as defined in 3GPP TS 38.214.

The PRBs for PUSCH resource are same for all PUSCH resources in 'duration' slots and are indicated by parameter 'Msg3 PUSCH frequency resource allocation'. The starting PRB and length in PRBs of PUSCH resource are determined using the parameter 'Msg3 PUSCH frequency resource allocation' as defined in 3GPP TS 38.214.

In an alternate embodiment of this method, the parameter 'offset' and/or 'duration' can be signaled in RACH configuration instead of UL grant contents. RACH configuration is signaled by gNB in SI or dedicated RRC signaling.

In an alternate embodiment of this method, the parameter 'offset' and/or 'duration' can be signaled in PUSCH-TimeDomainResourceAllocation IE of PUSCH-TimeDomainResourceAllocation list signaled by RRC (dedicated signaling or SI) instead of UL grant contents. RACH configuration is signaled by gNB in SI or dedicated RRC signaling.

In an embodiment, one of these parameters (offset and 'duration') can be signaled in in PUSCH-TimeDomainResourceAllocation IE of PUSCH-TimeDomainResourceAllocation list signaled by RRC (dedicated signaling or SI) and another can be signaled in RAR.

In an alternate embodiment of this method, instead of parameter 'duration,' number of PUSCH resources can be signaled. In this case, duration in above description is equal to 'number of PUSCH resources*offset'.

In this method, if PUSCH resources are there in multiple slots, the UE will transmit Msg3 in PUSCH resource in one of these slots where LBT is successful. The UE may transmit Msg3 in earliest PUSCH resource where LBT is successful.

In each of the methods from Method 1 to Method 4, symbolBitmap may also be signaled in RAR or PUSCH-TimeDomainResourceAllocation IE. The symbolBitmap is applicable to slots which have the PUSCH resource (as determined by Method 1 to Method 4).

In an embodiment, the first/leftmost bit of 'symbolBitmap' set to 1 indicates that PUSCH resource starts at first symbol of slot. The second bit of 'symbolBitmap' set to 1 indicates that PUSCH resource starts at $2^{nd}$ symbol of slot and so on. Each PUSCH resource consists of L consecutive symbols. In an alternate embodiment, 'symbolBitmap' indicates additional symbols other than symbol S.

In alternate embodiment, additional symbols (in addition to symbol S) of slot where PUSCH resource starts are indicated by 'symbolBitmap'. The first/leftmost bit of 'symbolBitmap' set to 1 indicates that PUSCH resource also starts at symbol S+1. The second bit of 'symbolBitmap' set to 1 indicates that PUSCH resource starts at symbol S+2. The third bit of 'symbolBitmap' set to 1 indicates that PUSCH resource starts at symbol S+3 and so on. Each PUSCH resource consists of L consecutive symbols.

Figure 10:
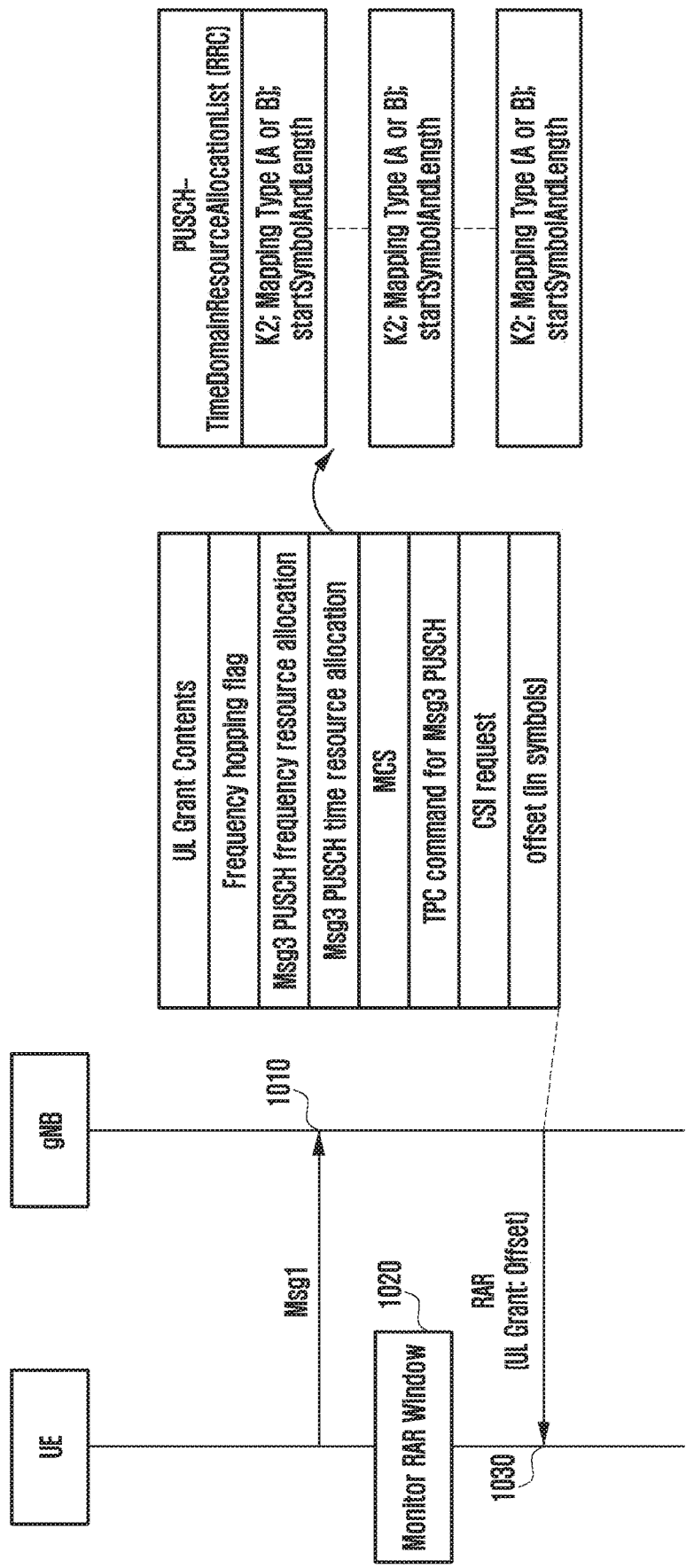
FIG. 10 shows signaling flows between a UE and a gNB according to an embodiment of the disclosure.

One or More PUSCH Resources in Slot
Method 5:

FIG. 10 shows signaling flows between a UE and a gNB according to an embodiment of the disclosure.

Referring to FIG. 10, after a UE transmits a Msg1 to a gNB at operation 1010, the UE monitors an RAR window at operation 1020. The gNB transmits UL grant in an RAR (or Msg2) at operation 1030. The UL grant may include at least one of information on frequency hopping flag, Msg3 PUSCH frequency resource allocation, Msg3 PUSCH time resource allocation, MCS, TPC command for Msg3 PUSCH, or CSI request. A new parameter 'offset' is also included in UL grant contents. The value of this parameter is in OFDM symbols.

Figure 11:
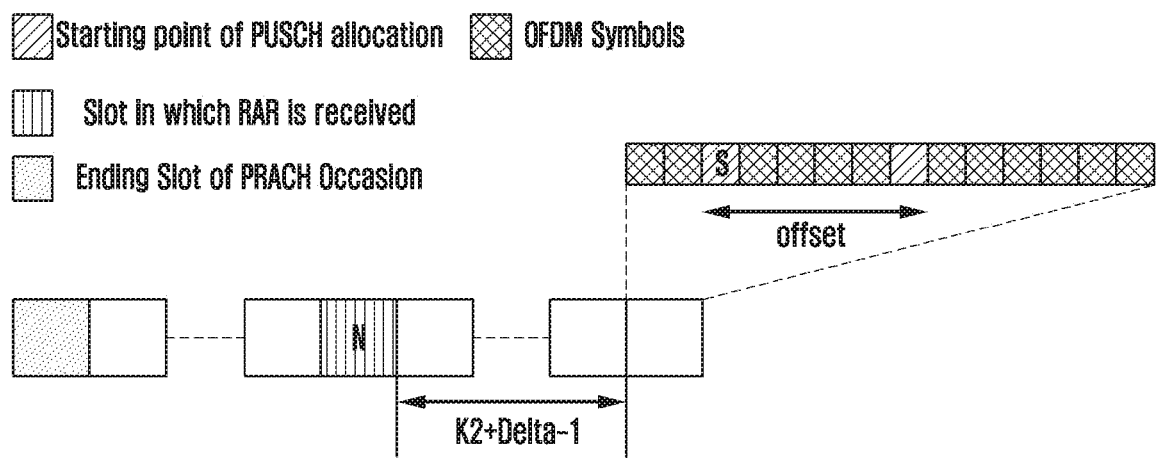
FIG. 11 shows an example of one or more PUSCH resources in slot according to an embodiment of the disclosure.

FIG. 11 shows an example of one or more PUSCH resources in slot according to an embodiment of the disclosure.

Referring to FIG. 11, RAR is received in nth slot of RAR window wherein the slot length is according to SCS for RAR (i.e. SCS for PDCCH reception for RAR). In this method, one or more PUSCH resource for Msg3 are in slot 'N+$K_2$+Delta' where N=n*($2^{scs\_msg3}/2^{scs\_rar}$). Delta is specific to Msg3 SCS and is pre-defined for each SCS. $K_2$ is indicated by 'Msg3 PUSCH time resource allocation' field in UL grant.

In this method, Pt PUSCH resource for Msg3 starts at symbol S of slot 'N+$K_2$+Delta' and consists of L consecutive symbols. The 2nd PUSCH resource starts at symbol 'S+offset' of slot 'N+$K_2$+Delta' and consists of L consecutive symbols. The 3rd PUSCH resource starts at symbol S+2*offset of slot 'N+$K_2$+Delta' and consists of L consecutive symbols. The ith PUSCH resource starts at symbol S+(i–1)*offset of slot 'N+$K_2$+Delta' and consists of L consecutive symbols, i is an integer such that symbol 'S+(i–1)*offset' belongs to slot 'N+$K_2$+Delta'. S and L are indicated by parameter 'Msg3 PUSCH time resource allocation' in UL grant.

An 'Msg3 PUSCH time resource allocation' field value m indicates a row index m+1 to the list PUSCH-TimeDomainResourceAllocationList signaled by RRC (dedicated signaling or SI). The indexed row defines the slot offset $K_2$, the start and length indicator SLIV, and the PUSCH mapping type to be applied in the PUSCH transmission. The starting symbol S relative to the start of the slot, and the number of consecutive symbols L counting from the symbol S allocated for the PUSCH are determined from the start and length indicator SLIV of the indexed row as defined in 3GPP TS 38.214.

The PRBs for PUSCH resource are same for all PUSCH resources determined above and are indicated by parameter 'Msg3 PUSCH frequency resource allocation'. The starting PRB and length in PRBs of PUSCH resource are determined using the parameter 'Msg3 PUSCH frequency resource allocation' as defined in 3GPP TS 38.214.

In an alternate embodiment of this method, the parameter 'offset' can be signaled in RACH configuration instead of UL grant contents. RACH configuration is signaled by gNB in SI or dedicated RRC signaling.

In an alternate embodiment of this method, the parameter 'offset' can be signaled in PUSCH-TimeDomainResourceAllocation IE of PUSCH-TimeDomainResourceAllocation list signaled by RRC (dedicated signaling or SI) instead of UL grant contents.

The UE transmits Msg3 in PUSCH resource where LBT is successful. The UE may transmit Msg3 in earliest PUSCH resource where LBT is successful.

Figure 12:
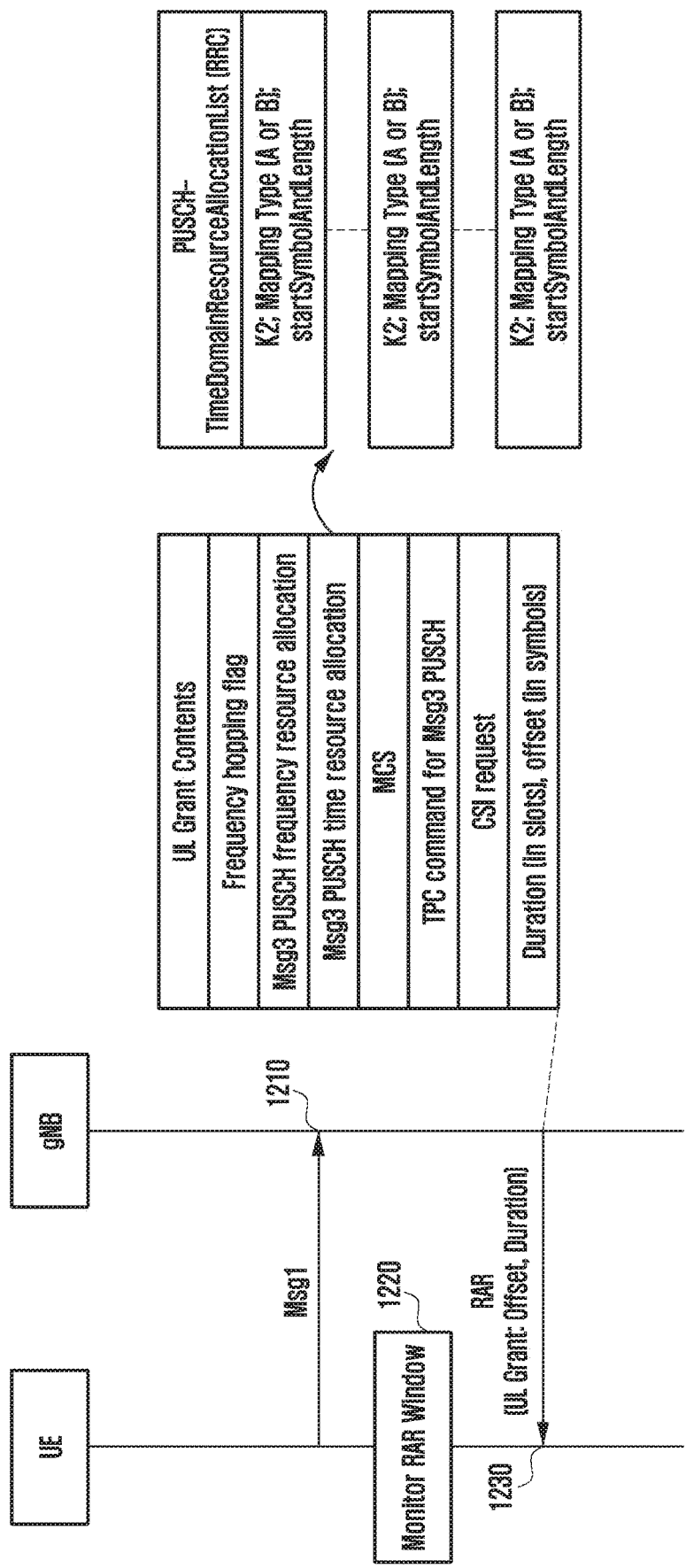
FIG. 12 shows signaling flows between a UE and a gNB according to an embodiment of the disclosure.

Method 6:

FIG. 12 shows signaling flows between a UE and a gNB according to an embodiment of the disclosure.

Referring to FIG. 12, after a UE transmits a Msg1 to a gNB at operation 1210, the UE monitors an RAR window at operation 1220. The gNB transmits UL grant in an RAR (or Msg2) at operation 1230. The UL grant may include at least one of information on frequency hopping flag, Msg3 PUSCH frequency resource allocation, Msg3 PUSCH time resource allocation, MCS, TPC command for Msg3 PUSCH, or CSI request. New parameters 'offset' and 'duration' are also included in UL grant contents. The value of parameter 'offset' is in OFDM symbols. The value of parameter 'duration' is in slots wherein the length of slot is determined based on Msg3 SCS. Msg3 SCS is signaled by gNB. The length of slot for various SCSs is pre-defined.

Figure 13:
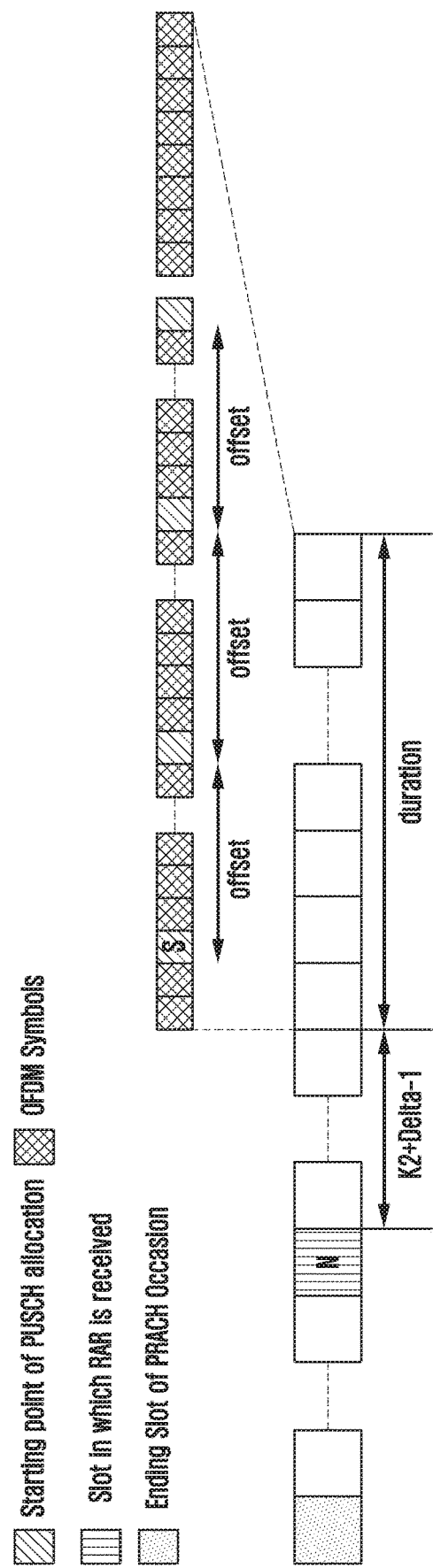
FIG. 13 shows an example of one or more PUSCH resources in slot according to an embodiment of the disclosure.

FIG. 13 shows an example of one or more PUSCH resources in slot according to an embodiment of the disclosure.

Referring to FIG. 13, RAR is received in $n^{th}$ slot of RAR window wherein the slot length is according to SCS for RAR (i.e. SCS for PDCCH reception for RAR). In this method, the 'duration' starts from slot 'N+$K_2$+Delta' where N=n*($2^{scs\_msg3}/2^{scs\_rar}$). Delta is specific to Msg3 SCS and is pre-defined for each SCS. $K_2$ is indicated by 'Msg3 PUSCH time resource allocation' field in UL grant.

In this method, $1^{st}$ PUSCH resource for Msg3 starts at symbol S of slot 'N+$K_2$+Delta' and consists of L consecutive symbols. The $2^{nd}$ PUSCH resource starts at symbol number 'S+offset' and consists of L consecutive symbols. The $3^{rd}$ PUSCH resource starts at symbol number 'S+2*offset' and consists of L consecutive symbols. The ith PUSCH resource starts at symbol number 'S+(i−1)*offset' and consists of L consecutive symbols, i is an integer such that symbol number 'S+(i−1)*offset' belongs to 'duration'. Symbols in duration are sequentially numbered from zero. S and L are indicated by parameter 'Msg3 PUSCH time resource allocation' in UL grant.

An 'Msg3 PUSCH time resource allocation' field value m indicates a row index m+1 to the list PUSCH-TimeDomainResourceAllocationList signaled by RRC (dedicated signaling or SI). The indexed row defines the slot offset $K_2$, the start and length indicator SLIV, and the PUSCH mapping type to be applied in the PUSCH transmission. The starting symbol S relative to the start of the slot, and the number of consecutive symbols L counting from the symbol S allocated for the PUSCH are determined from the start and length indicator SLIV of the indexed row as defined in 3GPP TS 38.214.

The PRBs for PUSCH resource are same for all PUSCH resources determined above and are indicated by parameter 'Msg3 PUSCH frequency resource allocation'. The starting PRB and length in PRBs of PUSCH resource are determined using the parameter 'Msg3 PUSCH frequency resource allocation' as defined in 3GPP TS 38.214.

In an alternate embodiment of this method, the parameter 'offset' and/or 'duration' can be signaled in RACH configuration instead of UL grant contents. RACH configuration is signaled by gNB in SI or dedicated RRC signaling.

In an alternate embodiment of this method, the parameter 'offset' and/or 'duration' can be signaled in PUSCH-TimeDomainResourceAllocation IE of PUSCH-TimeDomainResourceAllocation list signaled by RRC (dedicated signaling or SI) instead of UL grant contents.

In an embodiment, one of these parameters (offset and 'duration') can be signaled in in PUSCH-TimeDomainResourceAllocation IE of PUSCH-TimeDomainResourceAllocation list signaled by RRC (dedicated signaling or SI) and another can be signaled in RAR.

The UE transmits Msg3 in PUSCH resource where LBT is successful. The UE may transmit Msg3 in earliest PUSCH resource where LBT is successful.

Figure 14:
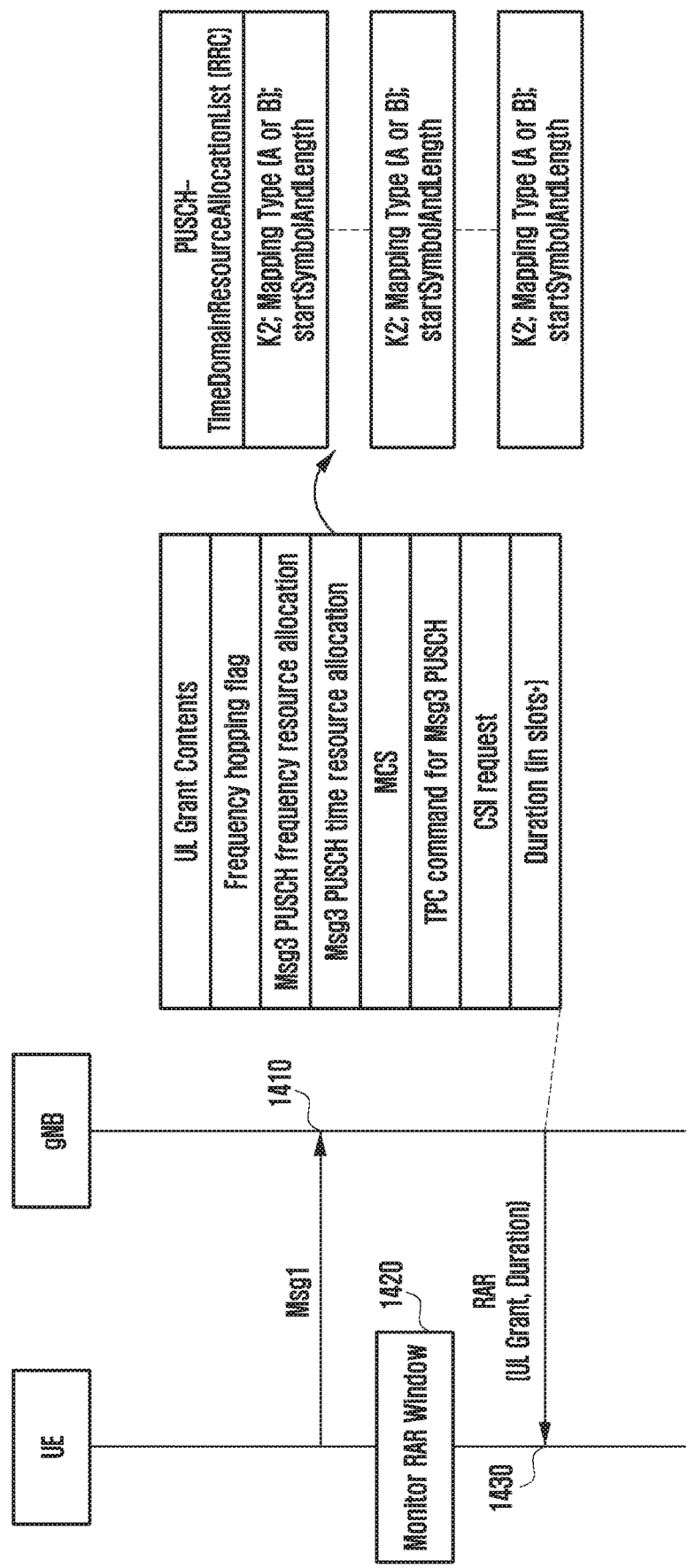
FIG. 14 shows signaling flows between a UE and a gNB according to an embodiment of the disclosure.

Method 7:

FIG. 14 shows signaling flows between a UE and a gNB according to an embodiment of the disclosure.

Referring to FIG. 14, after a UE transmits a Msg1 to a gNB at operation 1410, the UE monitors an RAR window at operation 1420. The gNB transmits UL grant in an RAR (or Msg2) at operation 1430. The UL grant may include at least one of information on frequency hopping flag, Msg3 PUSCH frequency resource allocation, Msg3 PUSCH time resource allocation, MCS, TPC command for Msg3 PUSCH, or CSI request. A new parameter 'duration' is also included in UL grant contents. The value of parameter 'duration' is in slots wherein the length of slot is determined based on Msg3 SCS. Msg3 SCS is signaled by gNB. The length of slot for various SCSs is pre-defined.

Figure 15:
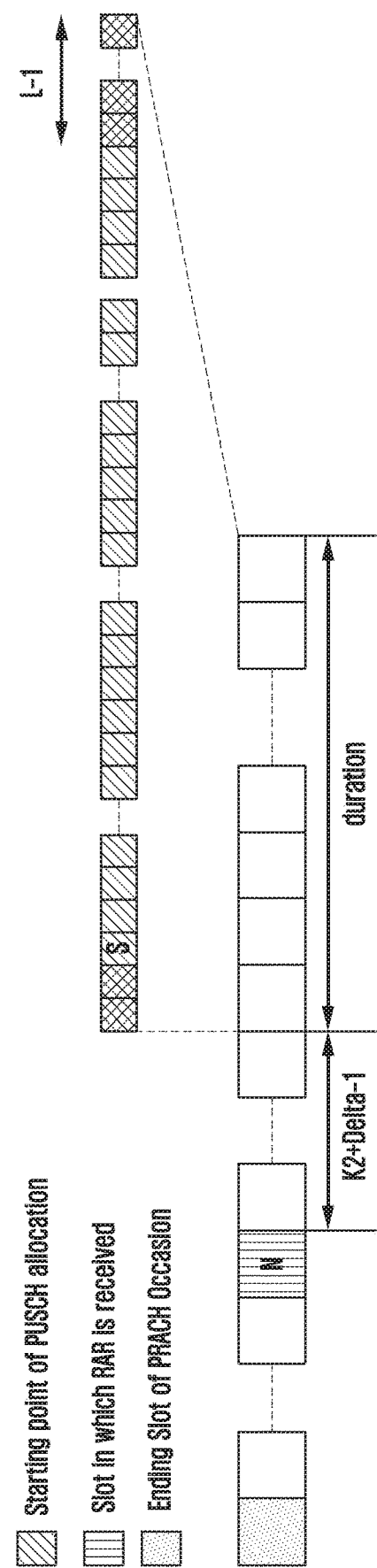
FIG. 15 shows an example of one or more PUSCH resources in slot according to an embodiment of the disclosure.

FIG. 15 shows an example of one or more PUSCH resources in slot according to an embodiment of the disclosure.

Referring to FIG. 15, RAR is received in nth slot of RAR window wherein the slot length is according to SCS for RAR (i.e. SCS for PDCCH reception for RAR). In this method, the 'duration' starts from slot 'N+$K_2$+Delta' where N=n* ($2^{scs\_msg3}/2^{scs\_rar}$). Delta is specific to Msg3 SCS and is pre-defined for each SCS. $K_2$ is indicated by 'Msg3 PUSCH time resource allocation' field in UL grant.

In this method, $1^{st}$ PUSCH resource for Msg3 starts at symbol S of slot 'N+$K_2$+Delta' and consists of L consecutive symbols. The PUSCH resource also starts at each of the subsequent symbols (except the last L−1 symbols of duration). Each PUSCH resource consists of L consecutive symbols. S and L are indicated by parameter 'Msg3 PUSCH time resource allocation' in UL grant.

An 'Msg3 PUSCH time resource allocation' field value m indicates a row index m+1 to the list PUSCH-TimeDomainResourceAllocationList signaled by RRC (dedicated signaling or SI). The indexed row defines the slot offset $K_2$, the start and length indicator SLIV, and the PUSCH mapping type to be applied in the PUSCH transmission. The starting symbol S relative to the start of the slot, and the number of consecutive symbols L counting from the symbol S allocated for the PUSCH are determined from the start and length indicator SLIV of the indexed row as defined in 3GPP TS 38.214.

The PRBs for PUSCH resource are same for all PUSCH resources determined above and are indicated by parameter 'Msg3 PUSCH frequency resource allocation'. The starting PRB and length in PRBs of PUSCH resource are determined using the parameter 'Msg3 PUSCH frequency resource allocation' as defined in 3GPP TS 38.214.

In an alternate embodiment of this method, the parameter 'duration' can be signaled in RACH configuration instead of UL grant contents. RACH configuration is signaled by gNB in SI or dedicated RRC signaling.

In an alternate embodiment of this method, the parameter 'duration' can be signaled in PUSCH-TimeDomainResourceAllocation IE of PUSCH-TimeDomainResourceAllocation list signaled by RRC (dedicated signaling or SI) instead of UL grant contents.

The UE transmits Msg3 in PUSCH resource where LBT is successful. The UE may transmit Msg3 in earliest PUSCH resource where LBT is successful.

Figure 16:
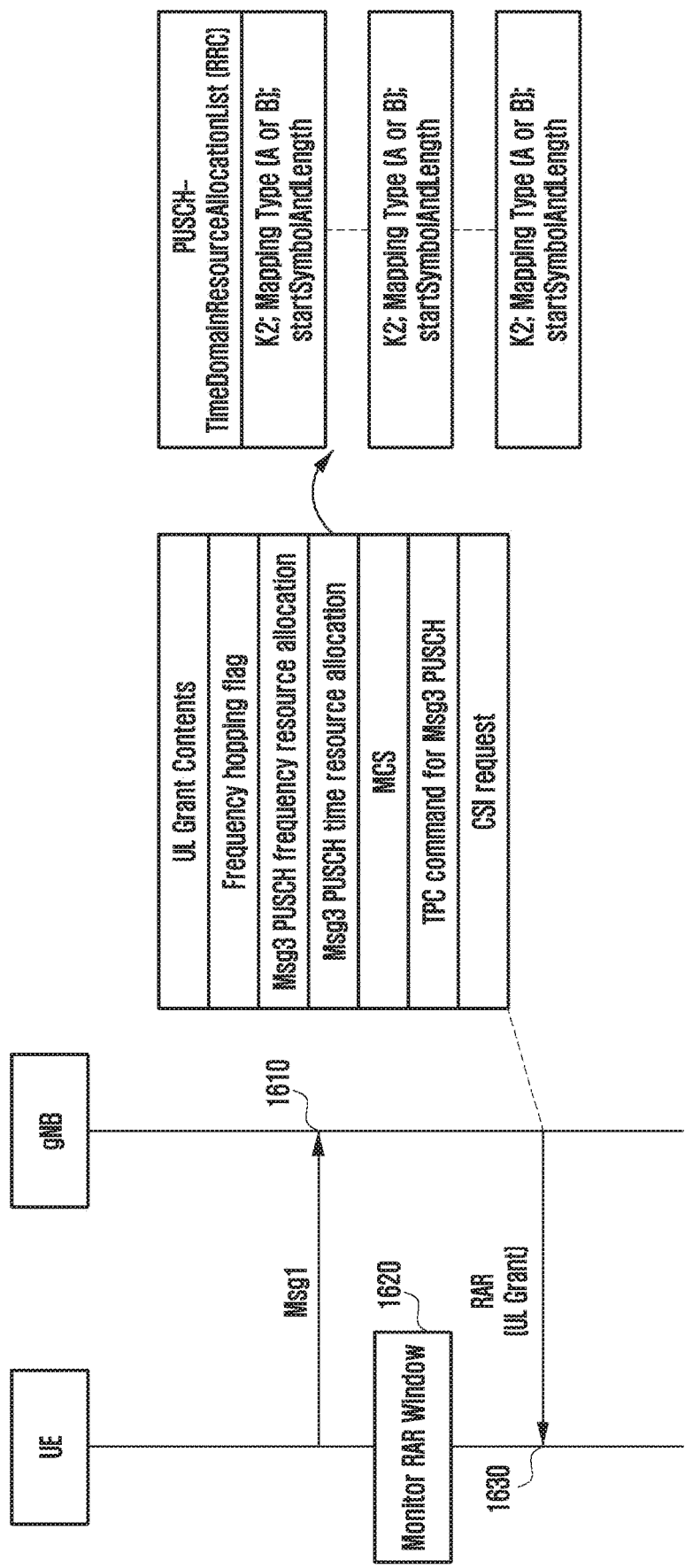
FIG. 16 shows signaling flows between a UE and a gNB according to an embodiment of the disclosure.

Method 8:

FIG. 16 shows signaling flows between a UE and a gNB according to an embodiment of the disclosure.

Referring to FIG. 16, after a UE transmits a Msg1 to a gNB at operation 1610, the UE monitors an RAR window at operation 1620. The gNB transmits UL grant in an RAR (or Msg2) at operation 1630. The UL grant may include at least one of information on frequency hopping flag, Msg3 PUSCH frequency resource allocation, Msg3 PUSCH time resource allocation, MCS, TPC command for Msg3 PUSCH, or CSI request.

Figure 17:
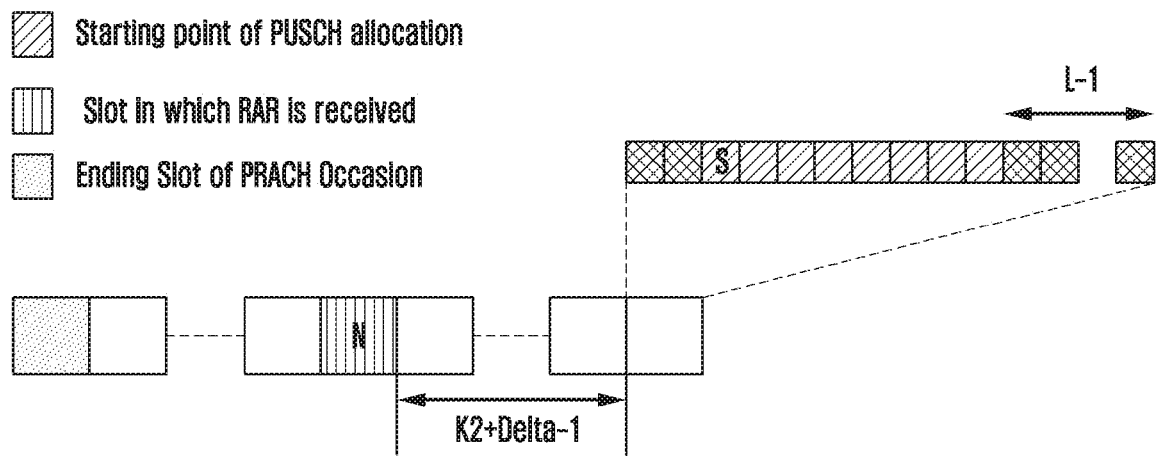
FIG. 17 shows an example of one or more PUSCH resources in slot according to an embodiment of the disclosure.

FIG. 17 shows an example of one or more PUSCH resources in slot according to an embodiment of the disclosure.

Referring to FIG. 17, RAR is received in nth slot of RAR window wherein the slot length is according to SCS for RAR (i.e. SCS for PDCCH reception for RAR). In this method, 1st PUSCH resource for Msg3 starts at symbol S of slot 'N+K2+Delta' and consists of L consecutive symbols, where N=n*(2scs_msg3/2scs_rar). Delta is specific to Msg3 SCS and is pre-defined for each SCS. K2 is indicated by 'Msg3 PUSCH time resource allocation' field in UL grant.

The PUSCH resource also starts at each of the subsequent symbols (except the last L−1 symbols) of slot 'N+K2+Delta'. Each PUSCH resource consists of L consecutive symbols. S and L are indicated by parameter 'Msg3 PUSCH time resource allocation' in UL grant.

An 'Msg3 PUSCH time resource allocation' field value m indicates a row index m+1 to the list PUSCH-TimeDomain- ResourceAllocationList signaled by RRC (dedicated signaling or SI). The indexed row defines the slot offset $K_2$, the start and length indicator SLIV, and the PUSCH mapping type to be applied in the PUSCH transmission. The starting symbol S relative to the start of the slot, and the number of consecutive symbols L counting from the symbol S allocated for the PUSCH are determined from the start and length indicator SLIV of the indexed row as defined in 3GPP TS 38.214.

The PRBs for PUSCH resource are same for all PUSCH resources determined above and are indicated by parameter 'Msg3 PUSCH frequency resource allocation'. The starting PRB and length in PRBs of PUSCH resource are determined using the parameter 'Msg3 PUSCH frequency resource allocation' as defined in 3GPP TS 38.214.

The UE transmits Msg3 in PUSCH resource where LBT is successful. The UE may transmit Msg3 in earliest PUSCH resource where LBT is successful.

Figure 18:
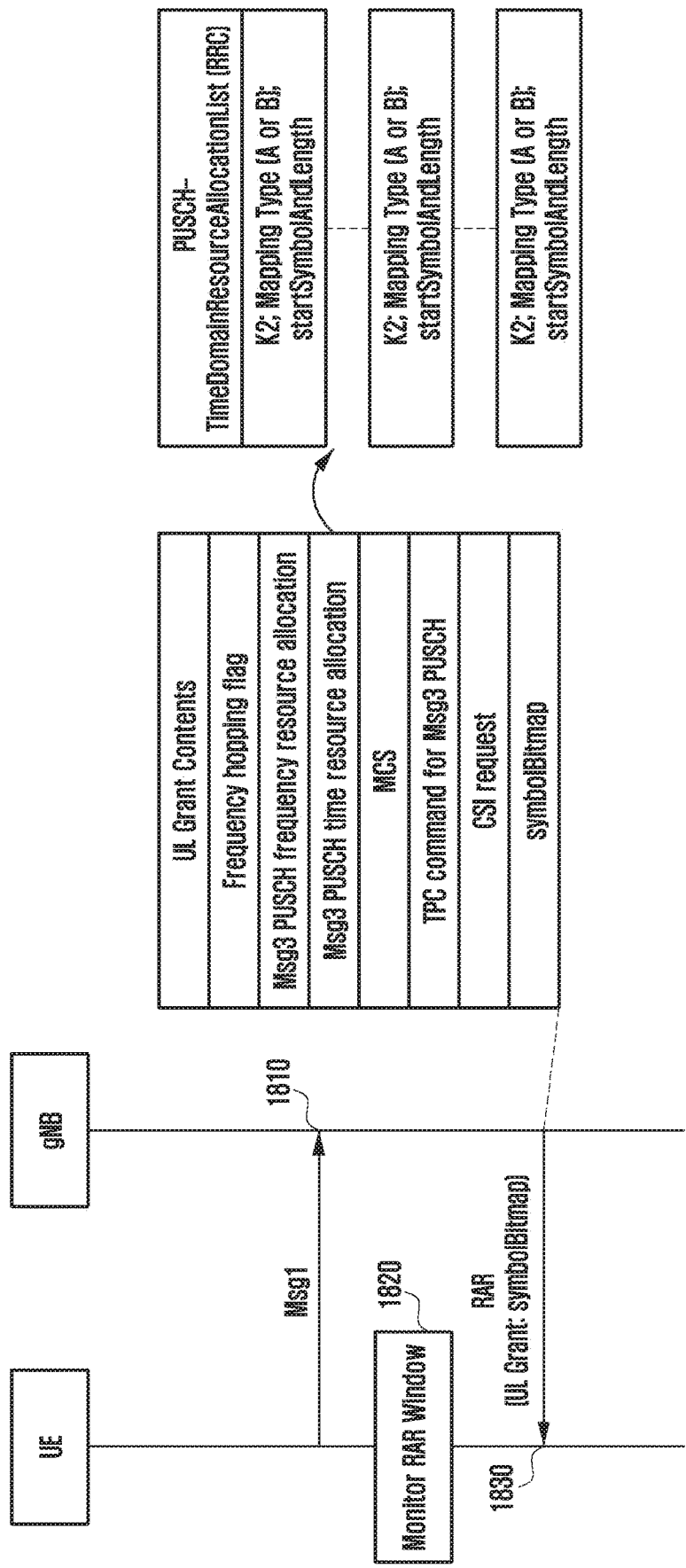
FIG. 18 shows signaling flows between a UE and a gNB according to an embodiment of the disclosure.

Method 9:

FIG. 18 shows signaling flows between a UE and a gNB according to an embodiment of the disclosure.

Referring to FIG. 18, after a UE transmits a Msg1 to a gNB at operation 1810, the UE monitors an RAR window at operation 1820. The gNB transmits UL grant in an RAR (or Msg2) at operation 1830. The UL grant may include at least one of information on frequency hopping flag, Msg3 PUSCH frequency resource allocation, Msg3 PUSCH time resource allocation, MCS, TPC command for Msg3 PUSCH, or CSI request. A new parameter 'symbolBitmap' is also included in UL grant contents.

Figure 19:
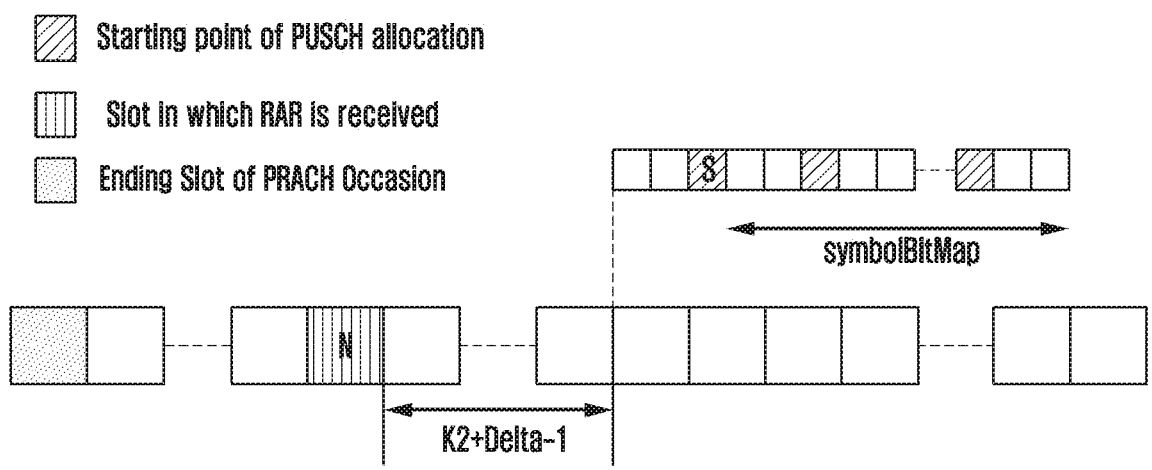
FIG. 19 shows an example of one or more PUSCH resources in slot according to an embodiment of the disclosure.

FIG. 19 shows an example of one or more PUSCH resources in slot according to an embodiment of the disclosure.

Referring to FIG. 19, RAR is received in nth slot of RAR window wherein the slot length is according to SCS for RAR (i.e. SCS for PDCCH reception for RAR). In one embodiment (as shown in FIG. 19) of this method, Pt PUSCH resource for Msg3 starts at symbol S of slot 'N+$K_2$+Delta' and consists of L consecutive symbols, where N=n*($2^{scs\_msg3}/2^{scs\_rar}$). Delta is specific to Msg3 SCS and is pre-defined for each SCS. $K_2$ is indicated by 'Msg3 PUSCH time resource allocation' field in UL grant. The first/leftmost bit of 'symbolBitmap' set to 1 indicates that PUSCH resource starts at symbol S+1. The second bit of 'symbolBitmap' set to 1 indicates that PUSCH resource starts at symbol S+2. The third bit of 'symbolBitmap' set to 1 indicates that PUSCH resource starts at symbol S+3 and so on. Each PUSCH resource consists of L consecutive symbols. S and L are indicated by parameter 'Msg3 PUSCH time resource allocation' in UL grant.

An 'Msg3 PUSCH time resource allocation' field value m indicates a row index m+1 to the list PUSCH-TimeDomain-ResourceAllocationList signaled by RRC (dedicated signaling or SI). The indexed row defines the slot offset $K_2$, the start and length indicator SLIV, and the PUSCH mapping type to be applied in the PUSCH transmission. The starting symbol S relative to the start of the slot, and the number of consecutive symbols L counting from the symbol S allocated for the PUSCH are determined from the start and length indicator SLIV of the indexed row as defined in 3GPP TS 38.214.

In alternate embodiment of this method, 'symbolBitmap' indicates the one or more OFDM symbols of slot 'N+$K_2$+Delta' where the PUSCH resource starts. N=n*($2^{scs\_msg3}/2^{scs\_rar}$). Delta is specific to Msg3 SCS and is pre-defined for each SCS. $K_2$ is indicated by 'Msg3 PUSCH time resource allocation' field in UL grant. The first/leftmost bit of 'symbolBitmap' set to 1 indicates that PUSCH resource starts at first symbol of slot 'N+$K_2$+Delta'. The second bit of 'symbolBitmap' set to 1 indicates that PUSCH resource starts at 2nd symbol of 'N+$K_2$+Delta' and so on. Each PUSCH resource consists of L consecutive symbols. L is indicated by parameter 'Msg3 PUSCH time resource allocation' in UL grant.

An 'Msg3 PUSCH time resource allocation' field value m indicates a row index m+1 to the list PUSCH-TimeDomain-ResourceAllocationList signaled by RRC (dedicated signaling or SI). The indexed row defines the slot offset $K_2$, the start and length indicator SLIV, and the PUSCH mapping type to be applied in the PUSCH transmission. The starting symbol S relative to the start of the slot, and the number of consecutive symbols L counting from the symbol S allocated for the PUSCH are determined from the start and length indicator SLIV of the indexed row as defined in 3GPP TS 38.214.

The PRBs for PUSCH resource are same for all PUSCH resources determined above and are indicated by parameter 'Msg3 PUSCH frequency resource allocation'. The starting PRB and length in PRBs of PUSCH resource are determined using the parameter 'Msg3 PUSCH frequency resource allocation' as defined in 3GPP TS 38.214.

In an alternate embodiment of this method, the parameter 'symbolBitmap' can be signaled in RACH configuration instead of UL grant contents. RACH configuration is signaled by gNB in SI or dedicated RRC signaling.

In an alternate embodiment of this method, the parameter 'symbolBitmap' can be signaled in PUSCH-TimeDomain-ResourceAllocation IE of PUSCH-TimeDomainResourceAllocation list signaled by RRC (dedicated signaling or SI) instead of UL grant contents.

The UE transmits Msg3 in PUSCH resource where LBT is successful. The UE may transmit Msg3 in earliest PUSCH resource where LBT is successful.

Figure 20:
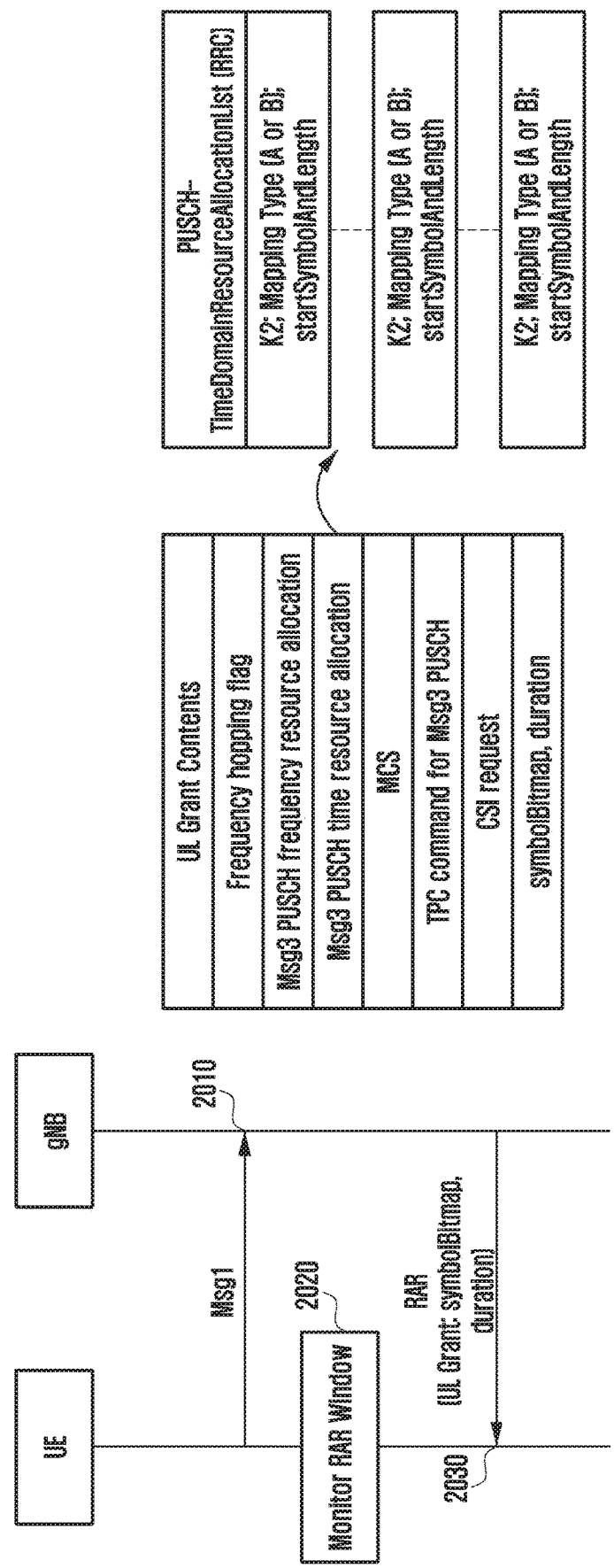
FIG. 20 shows signaling flows between a UE and a gNB according to an embodiment of the disclosure.

Method 10:

FIG. 20 shows signaling flows between a UE and a gNB according to an embodiment of the disclosure.

Referring to FIG. 20, after a UE transmits a Msg1 to a gNB at operation 2010, the UE monitors an RAR window at operation 2020. The gNB transmits UL grant in an RAR (or Msg2) at operation 2030. The UL grant may include at least one of information on frequency hopping flag, Msg3 PUSCH frequency resource allocation, Msg3 PUSCH time resource allocation, MCS, TPC command for Msg3 PUSCH, or CSI request. New parameters 'symbolBitmap' and 'duration' are also included in UL grant contents. The value of parameter 'duration' is in slots wherein the length of slot is determined based on Msg3 SCS. Msg3 SCS is signaled by gNB. The length of slot for various SCSs is pre-defined.

Figure 21:
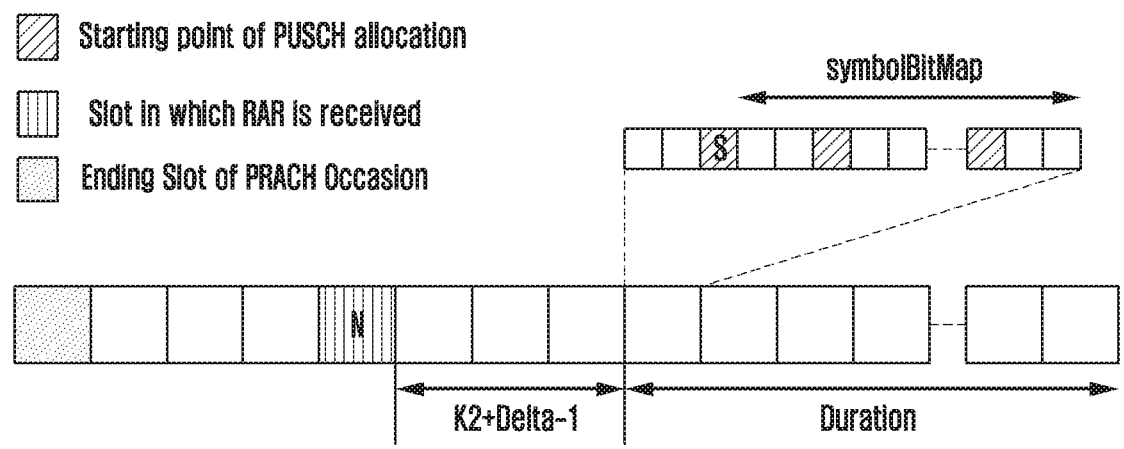
FIG. 21 shows an example of one or more PUSCH resources in slot according to an embodiment of the disclosure.

FIG. 21 shows an example of one or more PUSCH resources in slot according to an embodiment of the disclosure.

Referring to FIG. 21, RAR is received in $n^{th}$ slot of RAR window wherein the slot length is according to SCS for RAR (i.e. SCS for PDCCH reception for RAR). In this method, the 'duration' starts from slot 'N+$K_2$+Delta' where N=n*($2^{scs\_msg3}/2^{scs\_rar}$). Delta is specific to Msg3 SCS and is pre-defined for each SCS. $K_2$ is indicated by 'Msg3 PUSCH time resource allocation' field in UL grant.

In each slot of duration, PUSCH resource for Msg3 starts at symbol S of that slot and consists of L consecutive symbols. In each slot of duration, additional symbols of that slot where PUSCH resource starts are indicated by 'symbolBitmap'. The first/leftmost bit of 'symbolBitmap' set to 1 indicates that PUSCH resource also starts at symbol S+1. The second bit of 'symbolBitmap' set to 1 indicates that PUSCH resource starts at symbol S+2. The third bit of 'symbolBitmap' set to 1 indicates that PUSCH resource starts at symbol S+3 and so on. Each PUSCH resource consists of L consecutive symbols. S and L are indicated by parameter 'Msg3 PUSCH time resource allocation' in UL grant.

An 'Msg3 PUSCH time resource allocation' field value m indicates a row index m+1 to the list PUSCH-TimeDomain-ResourceAllocationList signaled by RRC (dedicated signaling or SI). The indexed row defines the slot offset $K_2$, the start and length indicator SLIV, and the PUSCH mapping type to be applied in the PUSCH transmission. The starting symbol S relative to the start of the slot, and the number of consecutive symbols L counting from the symbol S allocated for the PUSCH are determined from the start and length indicator SLIV of the indexed row as defined in 3GPP TS 38.214.

In alternate embodiment of this method, for each slot duration, 'symbolBitmap' indicates the one or more OFDM symbols of that slot where the PUSCH resource starts. $N=n*(2^{scs\_msg3}/2^{scs\_rar})$. Delta is specific to Msg3 SCS and is pre-defined for each SCS. $K_2$ is indicated by 'Msg3 PUSCH time resource allocation' field in UL grant. The first/leftmost bit of 'symbolBitmap' set to 1 indicates that PUSCH resource starts at first symbol of that slot. The second bit of 'symbolBitmap' set to 1 indicates that PUSCH resource starts at 2nd symbol of that slot and so on. Each PUSCH resource consists of L consecutive symbols. L is indicated by parameter 'Msg3 PUSCH time resource allocation' in UL grant.

An 'Msg3 PUSCH time resource allocation' field value m indicates a row index m+1 to the list PUSCH-TimeDomain-ResourceAllocationList signaled by RRC (dedicated signaling or SI). The indexed row defines the slot offset $K_2$, the start and length indicator SLIV, and the PUSCH mapping type to be applied in the PUSCH transmission. The starting symbol S relative to the start of the slot, and the number of consecutive symbols L counting from the symbol S allocated for the PUSCH are determined from the start and length indicator SLIV of the indexed row as defined in 3GPP TS 38.214.

The PRBs for PUSCH resource are same for all PUSCH resources determined above and are indicated by parameter 'Msg3 PUSCH frequency resource allocation'. The starting PRB and length in PRBs of PUSCH resource are determined using the parameter 'Msg3 PUSCH frequency resource allocation' as defined in 3GPP TS 38.214.

In an alternate embodiment of this method, the parameter 'symbolBitmap' and/or 'duration' can be signaled in RACH configuration instead of UL grant contents. RACH configuration is signaled by gNB in SI or dedicated RRC signaling.

In an alternate embodiment of this method, the parameter 'symbolBitmap' and/or 'duration' can be signaled in PUSCH-TimeDomainResourceAllocation IE of PUSCH-TimeDomainResourceAllocation list signaled by RRC (dedicated signaling or SI) instead of UL grant contents.

In an embodiment, one of these parameters ('symbolBitmap' and 'duration') can be signaled in in PUSCH-TimeDomainResourceAllocation IE of PUSCH-TimeDomainResourceAllocation list signaled by RRC (dedicated signaling or SI) and another can be signaled in RAR.

The UE transmits Msg3 in PUSCH resource where LBT is successful. The UE may transmit Msg3 in earliest PUSCH resource where LBT is successful.

Figure 22:
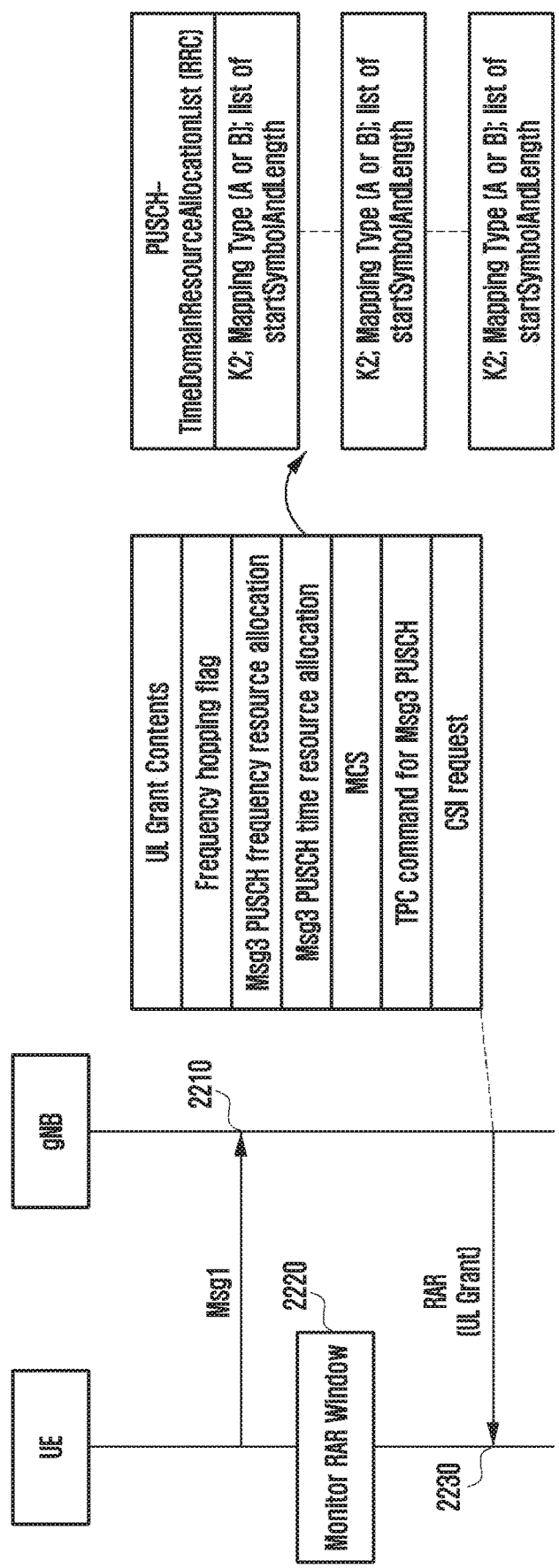
FIG. 22 shows signaling flows between a UE and a gNB according to an embodiment of the disclosure.

Method 11:

FIG. 22 shows signaling flows between a UE and a gNB according to an embodiment of the disclosure.

Referring to FIG. 22, after a UE transmits a Msg1 to a gNB at operation 2210, the UE monitors an RAR window at operation 2220. The gNB transmits UL grant in an RAR (or Msg2) at operation 2230. The UL grant may include at least one of information on frequency hopping flag, Msg3 PUSCH frequency resource allocation, Msg3 PUSCH time resource allocation, MCS, TPC command for Msg3 PUSCH, or CSI request. In this method, 'Msg3 PUSCH time resource allocation' field value m indicates a row index m+1 to the list PUSCH-TimeDomainResourceAllocationList wherein the indexed row includes a list of start and length indicator SLIV (each SLIV corresponds to one PUSCH resource). The list PUSCH-TimeDomainResourceAllocationList is signaled by RRC (dedicated signaling or SI).

Figure 23:
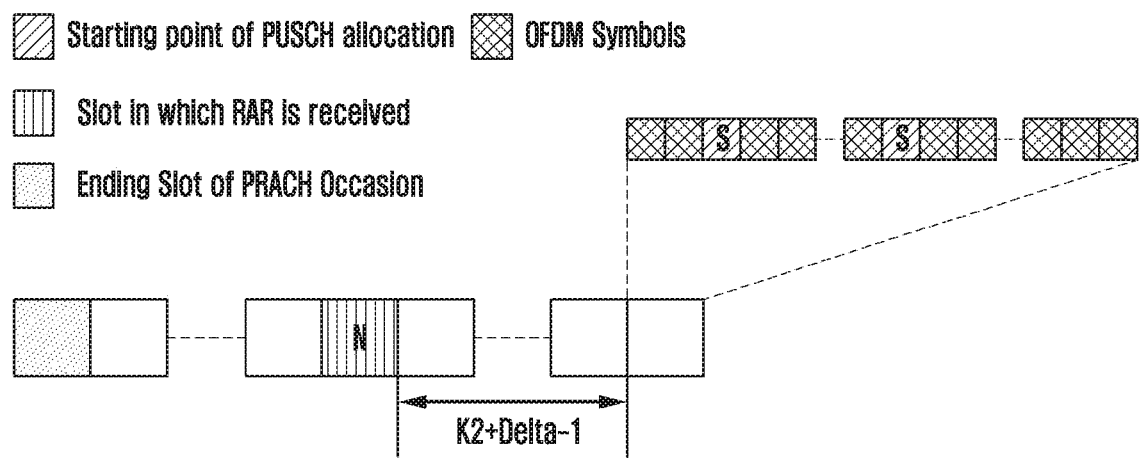
FIG. 23 shows an example of one or more PUSCH resources in slot according to an embodiment of the disclosure.

FIG. 23 shows an example of one or more PUSCH resources in slot according to an embodiment of the disclosure.

Referring to FIG. 23, RAR is received in nth slot of RAR window wherein the slot length is according to SCS for RAR (i.e. SCS for PDCCH reception for RAR). One or more PUSCH resources for Msg3 are allocated in slot $N+K_2+$ Delta, where $N=n*(2^{scs\_msg3}/2^{scs\_rar})$. Delta is specific to Msg3 SCS and is pre-defined for each SCS. $K_2$ is indicated by 'Msg3 PUSCH time resource allocation' field in UL grant. 'Msg3 PUSCH time resource allocation' field value m indicates a row index m+1 to the list PUSCH-TimeDomain-ResourceAllocationList signaled by RRC (dedicated signaling or SI). The indexed row defines the slot offset $K_2$, a list of start and length indicator SLIV (each SLIV corresponds to one PUSCH resource), and the PUSCH mapping type to be applied in the PUSCH transmission. The starting symbol S relative to the start of the slot $N+K_2+$Delta, and the number of consecutive symbols L counting from the symbol S allocated for the PUSCH are determined from the start and length indicator SLIV of the indexed row as defined in 3GPP TS 38.214.

The PRBs for PUSCH resource are same for all PUSCH resources determined above and are indicated by parameter 'Msg3 PUSCH frequency resource allocation'. The starting PRB and length in PRBs of PUSCH resource are determined using the parameter 'Msg3 PUSCH frequency resource allocation' as defined in 3GPP TS 38.214.

Figure 24:
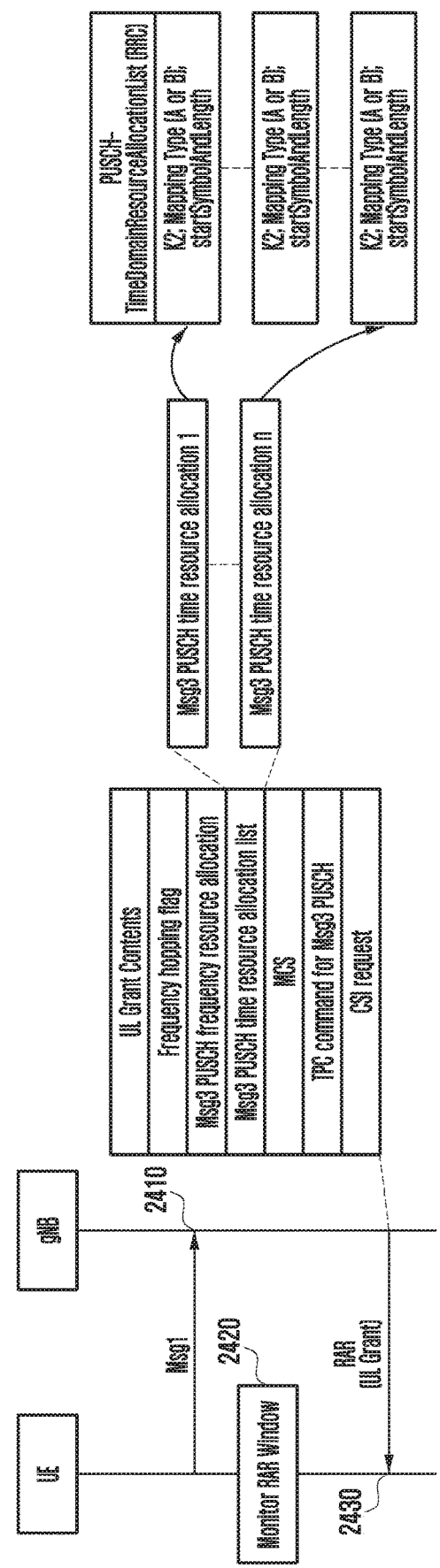
FIG. 24 shows signaling flows between a UE and a gNB according to an embodiment of the disclosure.

Method 12:

FIG. 24 shows signaling flows between a UE and a gNB according to an embodiment of the disclosure.

Referring to FIG. 24, after a UE transmits a Msg1 to a gNB at operation 2410, the UE monitors an RAR window at operation 2420. The gNB transmits UL grant in an RAR (or Msg2) at operation 2430. The UL grant may include at least one of information on frequency hopping flag, Msg3 PUSCH frequency resource allocation, MCS, TPC command for Msg3 PUSCH, or CSI request. In this method, UL grant also includes a list of Msg3 PUSCH time resource allocation. A field indicating length of UL grant field in RAR media access control (MAC) service data unit (SDU) can be indicated in RAR MAC subheader or in RAR MAC SDU. Alternately, field indicating number of entries in Msg3 PUSCH time resource allocation list in UL grant in RAR MAC SDU can be indicated in RAR MAC subheader or in RAR MAC SDU or in UL grant contents. Each Msg3 PUSCH time resource allocation in list indicates a PUSCH resource for Msg3. The UE determines the starting slot, symbol and length of each PUSCH resource as follows:

An 'Msg3 PUSCH time resource allocation' field value m indicates a row index m+1 to the list PUSCH-TimeDomain- ResourceAllocationList signaled by RRC (dedicated signaling or SI). The indexed row defines the slot offset $K_2$, a start and length indicator SLIV, and the PUSCH mapping type to be applied in the PUSCH transmission. The starting symbol S relative to the start of the slot $N+K_2+$Delta, and the number of consecutive symbols L counting from the symbol S allocated for the PUSCH are determined from the start and length indicator SLIV of the indexed row as defined in 3GPP TS 38.214.

RAR is received in $n^{th}$ slot of RAR window wherein the slot length is according to SCS for RAR (i.e. SCS for PDCCH reception for RAR). $N=n*(2^{scs\_msg3}/2^{scs\_rar})$.

Delta is specific to Msg3 SCS and is pre-defined for each SCS.

The PRBs for PUSCH resource are same for all PUSCH resources determined above and are indicated by parameter 'Msg3 PUSCH frequency resource allocation'. The starting PRB and length in PRBs of PUSCH resource are determined using the parameter 'Msg3 PUSCH frequency resource allocation' as defined in 3GPP TS 38.214.

Figure 25:
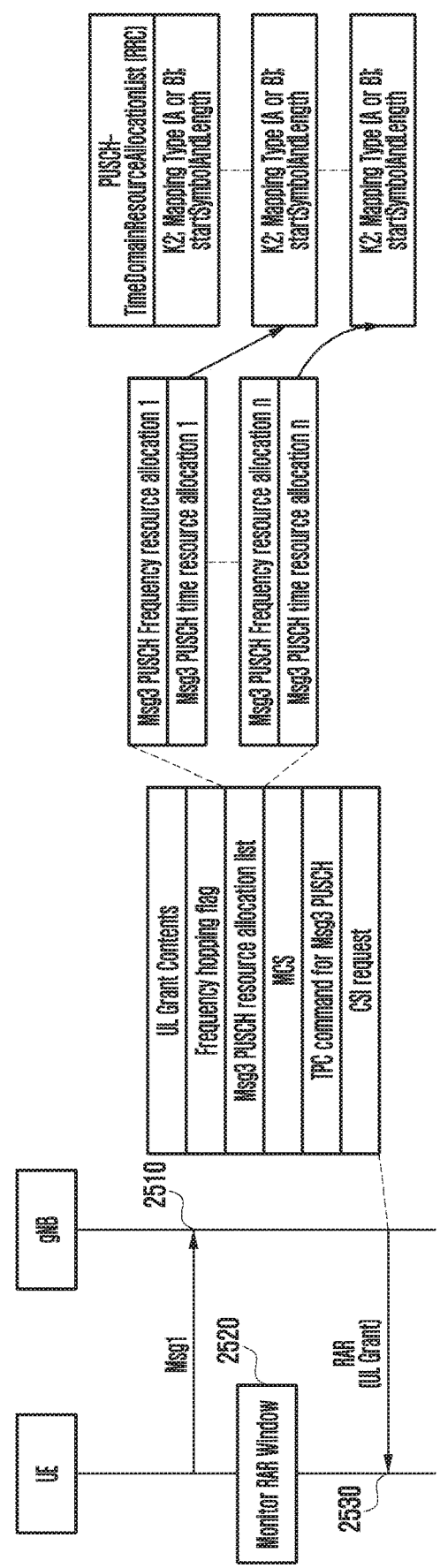
FIG. 25 shows signaling flows between a UE and a gNB according to an embodiment of the disclosure.

Method 13:

FIG. 25 shows signaling flows between a UE and a gNB according to an embodiment of the disclosure.

Referring to FIG. 25, after a UE transmits a Msg1 to a gNB at operation 2510, the UE monitors an RAR window at operation 2520. The gNB transmits UL grant in an RAR (or Msg2) at operation 2530. The UL grant may include at least one of information on frequency hopping flag, MCS, TPC command for Msg3 PUSCH, or CSI request. In this method, UL grant also includes a list of Msg3 PUSCH resource allocation. A field indicating length of UL grant field in RAR MAC SDU can be indicated in RAR MAC subheader or in RAR MAC SDU. Alternately, field indicating number of entries in Msg3 PUSCH resource allocation list in UL grant in RAR MAC SDU can be indicated in RAR MAC subheader or in RAR MAC SDU or in UL grant contents. Each Msg3 PUSCH resource allocation in list indicates Msg3 PUSCH time resource allocation and Msg3 PUSCH frequency resource allocation. The UE determines the starting slot, symbol and length of each PUSCH resource as follows:

An 'Msg3 PUSCH time resource allocation' field value m indicates a row index m+1 to the list PUSCH-TimeDomainResourceAllocationList signaled by RRC (dedicated signaling or SI). The indexed row defines the slot offset $K_2$, a start and length indicator SLIV, and the PUSCH mapping type to be applied in the PUSCH transmission. The starting symbol S relative to the start of the slot $N+K_2+$Delta, and the number of consecutive symbols L counting from the symbol S allocated for the PUSCH are determined from the start and length indicator SLIV of the indexed row as defined in 3GPP TS 38.214.

RAR is received in $n^{th}$ slot of RAR window wherein the slot length is according to SCS for RAR (i.e. SCS for PDCCH reception for RAR). $N=n*(2^{scs\_msg3}/2^{scs\_rar})$.

Delta is specific to Msg3 SCS and is pre-defined for each SCS.

The PRBs for PUSCH resource are indicated by parameter 'Msg3 PUSCH frequency resource allocation'. The starting PRB and length in PRBs of PUSCH resource are determined using the parameter 'Msg3 PUSCH frequency resource allocation' as defined in 3GPP TS 38.214.

In each of methods from Method 1 to Method 13, bandwidth part (BWP) identifier (ID) can also be included in RAR. The PUSCH resources indicated corresponds to UL BWP indicated by BWP ID.

In each of methods from Method 1 to Method 13, BWPBitmap can also be included in RAR. The PUSCH resources indicated corresponds to UL BWP(s) indicated by BWPBitmap. Alternately, BWPBitmap can be signaled in RACH configuration instead of UL grant contents. RACH configuration is signaled by gNB in SI or dedicated RRC signaling. Alternately, BWPBitmap can be signaled in PUSCH-TimeDomainResourceAllocation IE of PUSCH-TimeDomainResourceAllocation list signaled by RRC (dedicated signaling or SI) instead of UL grant contents. Instead of BWPBitmap, UL BWP List can be signaled. The PUSCH resources signaled in RAR corresponds to UL BWPs in UL BWP List (In other words, PUSCH resource parameters are applied to each UL BWP in UL BWP list. If PUSCH resource parameter indicates N PUSCH resources and there are M UL BWPs in UL BWP list, then there are N PUSCH resources in each of these M UL BWPs.)

Method 14:

In an alternate embodiment, a list of UL BWP can be signaled in SI.

Figure 26:
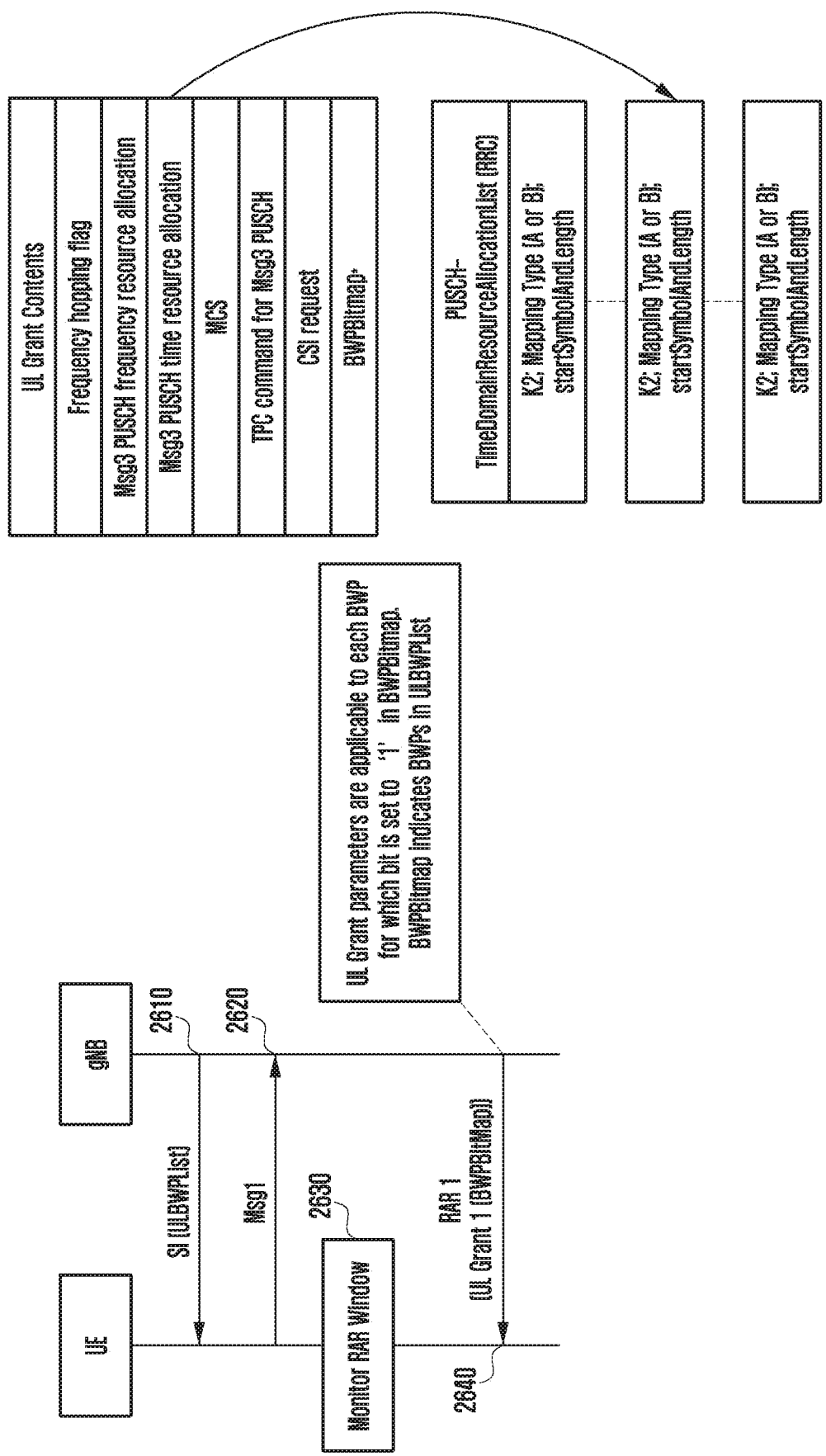
FIG. 26 shows signaling flows between a UE and a gNB according to an embodiment of the disclosure.

FIG. 26 shows signaling flows between a UE and a gNB according to an embodiment of the disclosure.

Referring to FIG. 26, after a gNB transmits an SI including ULBWPlist to a UE at operation 2610 and after the UE transmits a Msg1 to the gNB at operation 2620, the UE monitors an RAR window at operation 2630. The gNB transmits UL grant in an RAR (or Msg2) at operation 2640. The UL grant may include at least one of information on frequency hopping flag, Msg3 PUSCH frequency resource allocation, Msg3 PUSCH time resource allocation, MCS, TPC command for Msg3 PUSCH, or CSI request. UL grant in RAR can also include a BWPbitmap. UL grant parameters received in RAR are applicable to each UL BWP for which bit is set to 1 in BWPBitmap. Bits in BWPBitmap are mapped to BWPs in ULBWPlist. The first bit in BWPBitmap corresponds to first BWP in ULBWPlist. The second bit in BWPBitmap corresponds to second BWP in ULBWPlist and so on. UL grant parameter may indicate one or more PUSCH resource.

Frequency Domain Resources:

Multiple PUSCH resources in frequency domain can be signaled as follows:

Option 1: New Parameter prbBitmap can be signaled in UL grant contents. If a bit corresponding to a PRB is set to 1 in prbBitmap, then this PRB is the starting PRB of a PUSCH resource. By setting multiple bits of prbBitmap to 1, multiple starting PRBs can be indicated where each corresponds to a different PUSCH resource. The first/left most bit of prbBitmap corresponds to PRB (R) indicated by UL grant field Msg3 PUSCH frequency resource allocation. Length (L) of allocation in PRBs of each PUSCH resource is indicated by UL grant field Msg3 PUSCH frequency resource allocation.

Option 2: New Parameters prbBitmap and duration can be signaled in UL grant contents. This is same as option 1 except that prbBitmap is repeatedly applied for 'Duration' PRBs.

Option 3: New parameters offset and duration can be signaled in UL grant contents. PRB (R) indicated by UL grant field Msg3 PUSCH frequency resource allocation is the starting PRB of a PUSCH resource. PRB number 'R+offset' is the starting PRB of another PUSCH resource. From PRB R to PRB R+duration, PRB R, PRB R+offset, PRB R+2*offset, PRB R+3*offset are starting points of PUSCH resource. Length (L) of each PUSCH resource allocation in PRBs is indicated by UL grant field Msg3 PUSCH frequency resource allocation.

In an alternate embodiment of this method, the new parameters listed in Option 1/2/3 can be signaled in RACH configuration instead of UL grant contents. RACH configuration is signaled by gNB in SI or dedicated RRC signaling.

In an alternate embodiment of this method, the new parameters listed in Option 1/2/3 can be signaled in PUSCH-TimeDomainResourceAllocation IE of PUSCH-TimeDomainResourceAllocation list signaled by RRC (dedicated signaling or SI) instead of UL grant contents.

In an embodiment, some these new parameters can be signaled in in PUSCH-TimeDomainResourceAllocation IE of PUSCH-TimeDomainResourceAllocation list signaled by RRC (dedicated signaling or SI) and others can be signaled in RAR.

It is to be noted that methods explained above can also be used for PUSCH resource allocation via downlink control information (DCI). In this case, delta is set to zero. Parameters included in UL grant contents of RAR are included in DCI. SCS_RAR is SCS_PDCCH in this case. SCS_Msg3 is SCS_PUSCH in this case.

Method 15:

In a licensed carrier, RAR MAC PDU includes at most one RAR MAC subPDU for a RA preamble ID (RAPID). RAR MAC PDU can include multiple RAR MAC subPDUs wherein each RAR MAC subPDU belongs to different RAPID.

Figure 27:
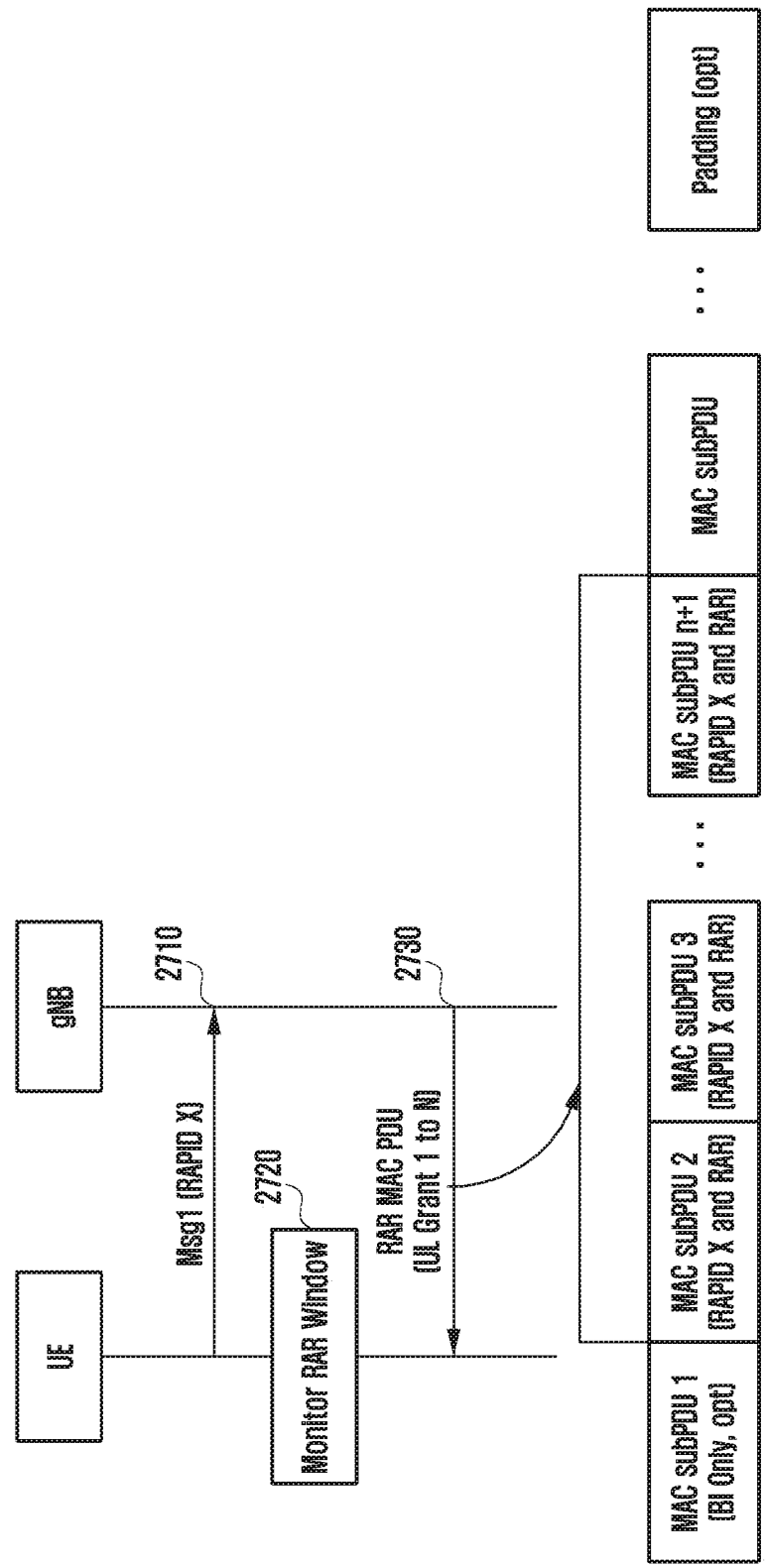
FIG. 27 shows signaling flows between a UE and a gNB according to an embodiment of the disclosure.

FIG. 27 shows signaling flows between a UE and a gNB according to an embodiment of the disclosure.

Referring to FIG. 27, after a UE transmits a Msg1 with an RA preamble ID (RAPID) X to a gNB at operation 2710, the UE monitors an RAR window at operation 2720. The gNB transmits multiple UL grants 1 to N in RAR MAC PDU at operation 2730. Specifically, for multiple Msg3 UL grants, gNB can include multiple RAR MAC subPDUs corresponding to same Msg1 (i.e. RAPID) in RAR MAC PDU. The advantage is that no change in RAR MAC PDU format is needed; additional PDCCHs/RAR MAC PDUs are not needed; no need to monitor RAR window after receiving RAR. The UE processes MAC subPDUs sequentially in received RAR MAC PDU. Even after receiving a RAR MAC subPDU corresponding to its RAPID, the UE continues to check other RAR MAC subPDUs unlike the existing system wherein UE stops processing remaining part of RAR MAC PDU if the UE finds an RAR MAC subPDU corresponding to its RAPID.

In an embodiment, in the received RAR MAC PDU, the UE needs to check all RAR MAC subPDUs for its RAPID. To minimize processing, all RAR MAC subPDUs corresponding to same RAPID are multiplexed one after another in RAR MAC PDU. After receiving an RAR MAC subPDU corresponding to its RAPID, the UE keeps checking the next RAR MAC subPDU until it finds an RAR MAC subPDU which does not correspond to its RAPID or there are no more RAR MAC subPDUs in RAR MAC PDU. In the received RAR MAC PDU, UL grant received in each RAR corresponding to its RAPID is a valid UL grant. TA command and temporary cell-radio network temporary identifier (TC-RNTI) received from all but one RAR are discarded.

In an embodiment, the UE performs the following when it processes the 'Nth' MAC subPDU in RAR MAC PDU.

If nth MAC subPDU belongs to UE's RAPID,
store RAR and go to next MAC subPDU in RAR MAC PDU.
Else if nth MAC subPDU does not belongs to UE's RAPID:
if n−1 th MAC subPDU belonged to UE's RAPID, stop processing and discard the remaining content of RAR MAC PDU,
else if n−1th MAC subPDU does not belong to UE's RAPID, go to next MAC subPDU in RAR MAC PDU.

In an embodiment, gNB does not multiplex RAR MAC subPDUs corresponding to Msg1 received in licensed carrier and unlicensed carrier. For example, primary cell (PCell) is unlicensed carrier and one or more secondary cells (SCells) of gNB are unlicensed carrier. In this case, gNB can receive Msg1 on PCell and SCell. RAR is transmitted on PCell.

In an embodiment, if multiple RAR MAC subPDUs corresponding to same RAPID are included in RAR MAC PDU, then in that RAR MAC PDU, gNB does not include RAR MAC subPDUs corresponding to Msg1 received in licensed carrier.

Fast Switching to Default BWP to Maximize Power Saving

In the 5G wireless communication system (also referred as next generation radio or NR), bandwidth adaptation (BA) is supported. With BA, the receive and transmit BWs (bandwidths) of a UE need not be as large as the BW of the cell and can be adjusted: the width can be changed (e.g. to shrink during period of low activity to save power); the location can move in the frequency domain (e.g. to increase scheduling flexibility); and the SCS can be changed (e.g. to allow different services). A subset of the total cell BW of a cell is referred to as a BWP and BA is achieved by configuring the UE with BWP(s) and telling the UE which of the configured BWPs is currently active. When BA is configured, the UE only has to monitor PDCCH on the one active BWP i.e. it does not have to monitor PDCCH on the entire downlink (DL) frequency of the serving cell. A serving cell is configured with one or more BWPs, and for a serving cell, there is one active BWP at any point in time. The active BWP can be switched to another BWP by the PDCCH indicating a DL assignment or an UL grant for that BWP, or by RRC signaling. Additionally, a BWP inactivity timer is used to switch the active DL BWP to the default DL BWP or initial DL BWP of a serving cell. One of the configured BWPs of a serving cell can be a default DL BWP and is indicated in BWP configuration received from gNB. Initial DL BWP is also signaled (either in SI or in dedicated signaling). If default DL BWP is configured and the current active DL BWP is not the default DL BWP, upon expiry of BWP inactivity timer, active DL BWP is switched to default DL BWP. If default DL BWP is not configured and the current active DL BWP is not the initial DL BWP, upon expiry of BWP inactivity timer, active DL BWP is switched to initial DL BWP.

Default DL BWP has narrow BW and hence minimizes UE's power consumption. Non-default DL BWP has wider BW and hence is suitable for data transmission.

Figure 28:
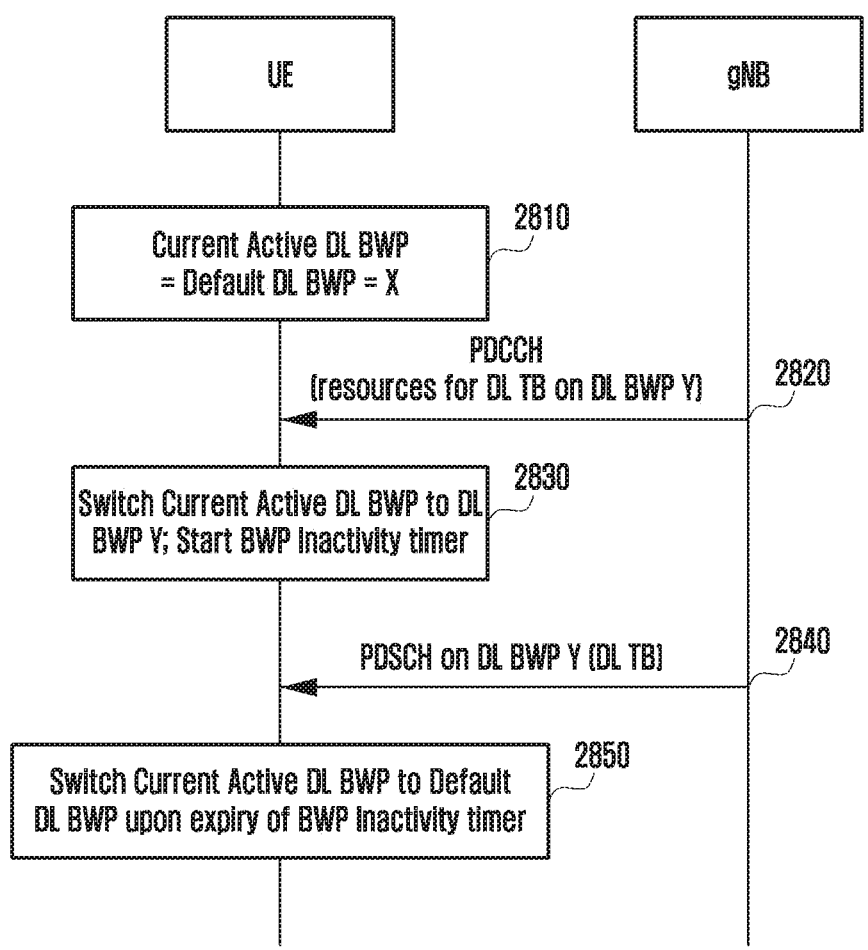
FIG. 28 shows signaling flows between a UE and a gNB according to an embodiment of the disclosure.

FIG. 28 shows signaling flows between a UE and a gNB according to an embodiment of the disclosure.

Referring to FIG. 28, the UE's current active DL BWP is the default DL BWP at operation 2810. GNB wants to schedule DL data to UE. So gNB transmits, via PDCCH, information indicating resources for DL transmission block (TB) on non-default DL BWP (say DL BWP Y) at operation 2820. gNB transmits the DL TB over PDSCH in DL BWP Y. Upon receiving information indicating resources for DL TB on non-default DL BWP Y at operation 2820, the UE switches its current active DL BWP to DL BWP Y at operation 2830. The UE starts the BWP inactivity timer. The UE monitors PDCCH and PDSCH on active DL BWP Y to receive the DL TB at operation 2840. The UE (re-)starts the BWP inactivity timer upon reception of PDCCH on or for DL BWP Y.

If there is no activity on DL BWP Y, eventually BWP inactivity timer will expire. Upon expiry of BWP inactivity timer, the UE switches to default DL BWP at operation 2850.

If the UE receives RRC reconfiguration message indicating the first active DL BWP as default DL BWP, the UE switches to default DL BWP.

The traffic is typically bursty and NR supports very high data rate, so the traffic burst can be transmitted in a very short time. Switching to default BWP based on inactivity timer or RRC reconfiguration message is inefficient for the UE's power consumption. Switching BWP quickly upon completion of traffic burst is beneficial for minimizing UE's power consumption.

Method 1:

FIGS. 29 to 32 show signaling flows between a UE and a gNB according to various embodiments of the disclosure.

In accordance with Method 1, a bwpSwitchToDefault indicator is included in DCI together with resources for TB. In an embodiment, if the UE receives DCI via a PDCCH addressed to it wherein the DCI includes bwpSwitchToDefault indicator and resources for DL TB, the UE switches to default DL BWP upon receiving the scheduled DL TB successfully (i.e. upon transmitting the hybrid automatic repeat request (HARQ) ack for the scheduled TB).

In case of carrier aggregation, there can be more than one active serving cell in UE. In an embodiment, if the UE receives DCI via a PDCCH addressed to it on serving cell m wherein the DCI includes bwpSwitchToDefault indicator and resources for DL TB of serving cell m, the UE switches the active DL BWP of serving cell m to default DL BWP upon receiving the scheduled DL TB successfully (i.e. upon transmitting the HARQ ack for the scheduled TB). In another embodiment, if the UE receives DCI via a PDCCH addressed to it on serving cell m wherein the DCI includes bwpSwitchToDefault indicator and resources for DL TB of serving cell n, the UE switches the active DL BWP of serving cell n to default DL BWP upon receiving the scheduled DL TB successfully (i.e. upon transmitting the HARQ ack for the scheduled TB).

Figure 29:
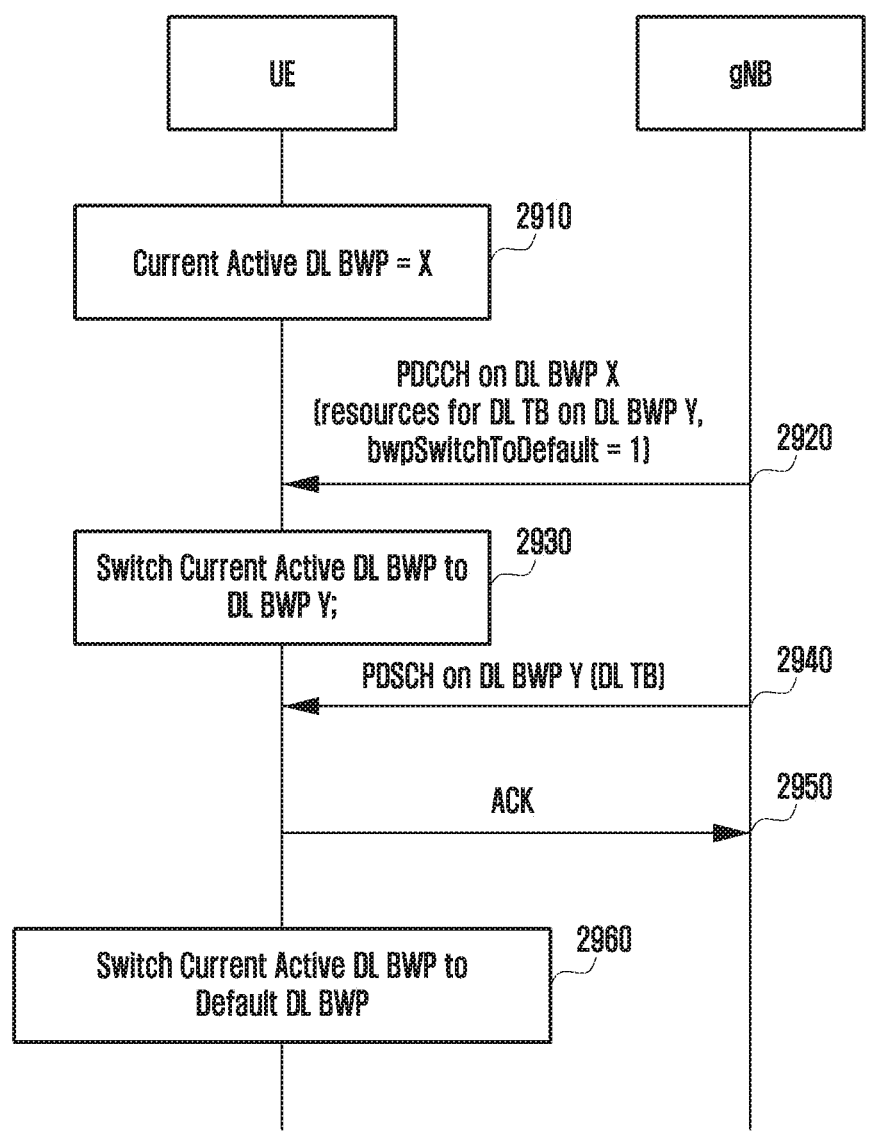
FIGS. 29 to 32 show signaling flows between a UE and a gNB according to various embodiments of the disclosure.

Referring to FIG. 29, the UE's current active DL BWP is DL BWP X at operation 2910. The UE receives DCI via a PDCCH on active DL BWP X where the DCI includes bwpSwitchToDefault indicator (set to 1) and resources on DL BWP Y for a DL TB at operation 2920. The UE switches the active DL BWP to DL BWP Y at operation 2930. The UE monitors the PDSCH on DL BWP Y and successfully receives the scheduled DL TB at operation 2940. The UE transmits the HARQ ACK to gNB for the received DL TB at operation 2950 and switches to default DL BWP at operation 2960. Note that if default DL BWP is not configured, the UE switches to initial DL BWP.

Figure 30:
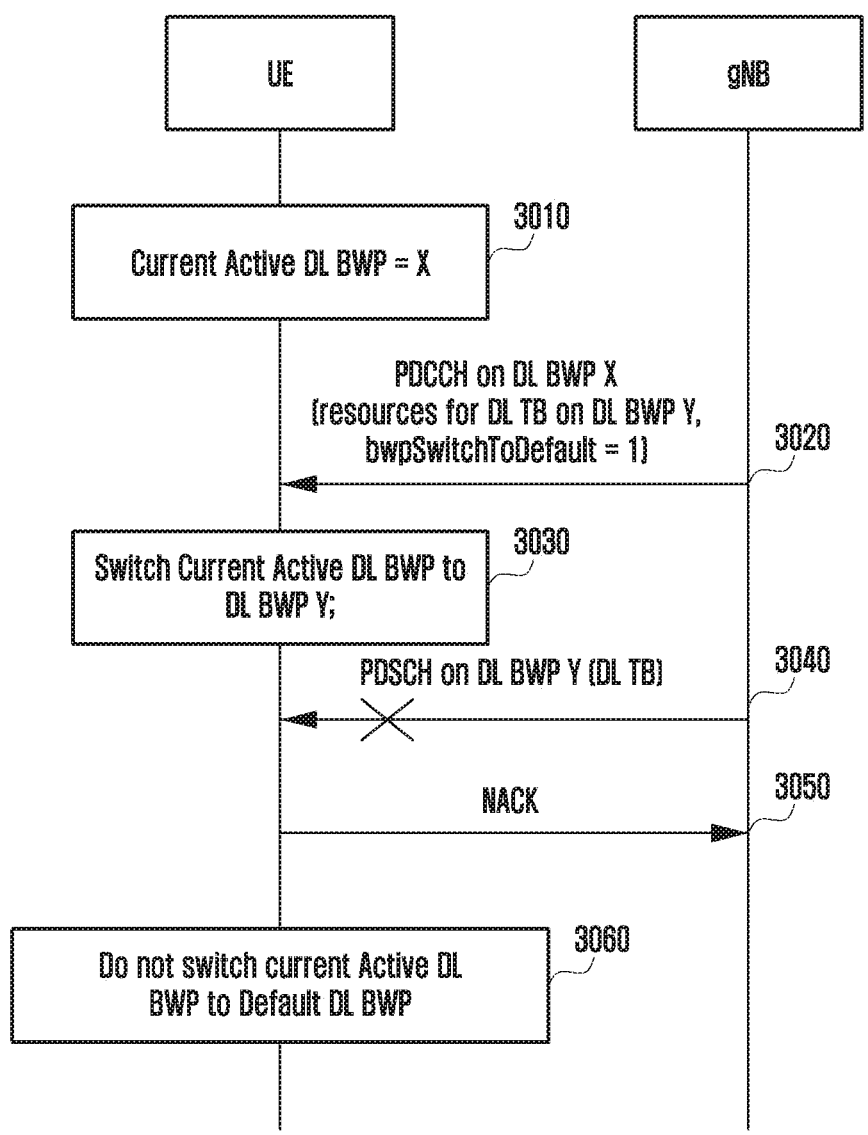

Referring to FIG. 30, the UE's current active DL BWP is DL BWP X at operation 3010. The UE receives DCI via a PDCCH on active DL BWP X where the DCI includes bwpSwitchToDefault indicator (set to 1) and resources on DL BWP Y for a DL TB at operation 3020. The UE switches the active DL BWP to DL BWP Y at operation 3030. The UE monitors the PDSCH on DL BWP Y and fails to receive the scheduled DL TB at operation 3040. The UE transmits the HARQ NACK to gNB for the received DL TB at operation 3050. The UE does not switch to default DL BWP at operation 3060.

Figure 31:
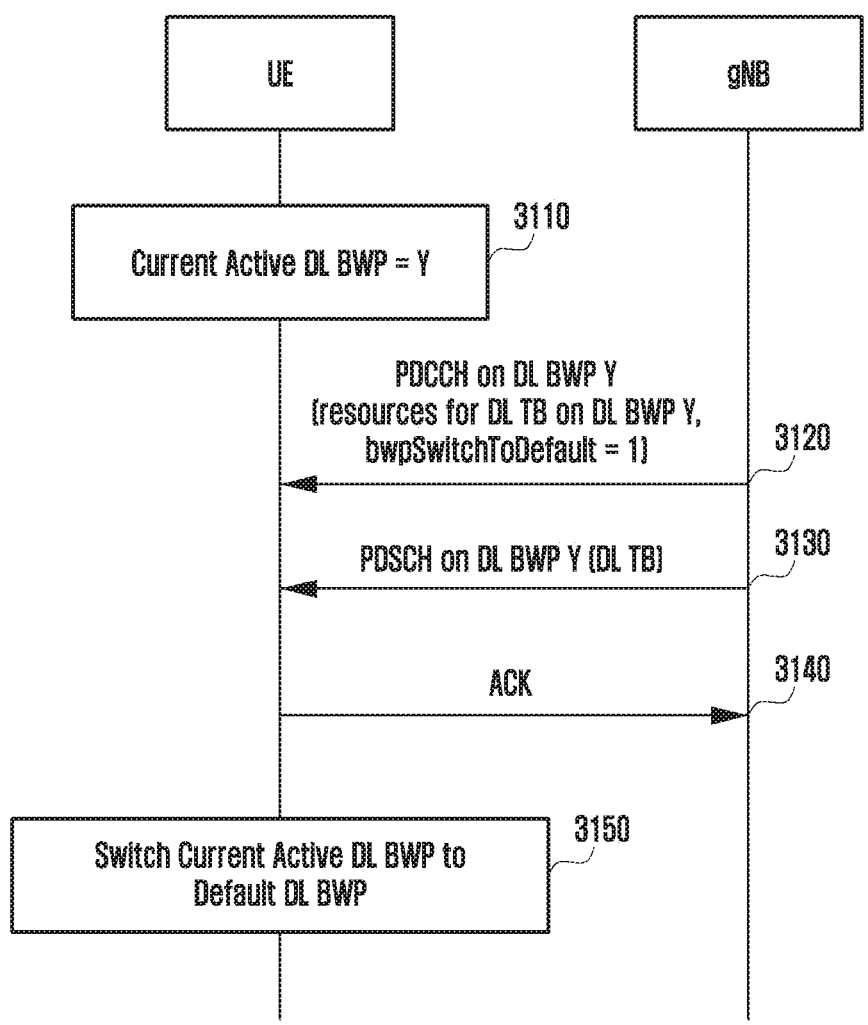

Referring to FIG. 31, the UE's current active DL BWP is DL BWP Y at operation 3110. The UE receives DCI via a PDCCH addressed to it on active DL BWP Y where the DCI includes bwpSwitchToDefault indicator (set to 1) and resources on DL BWP Y for a DL TB at operation 3120. The UE monitors the PDSCH on DL BWP Y and successfully receives the scheduled DL TB at operation 3130. The UE transmits the HARQ ACK to gNB for the received DL TB at operation 3140, and switches to default DL BWP at operation 3150. Note that if default DL BWP is not configured, the UE switches to initial DL BWP.

Figure 32:
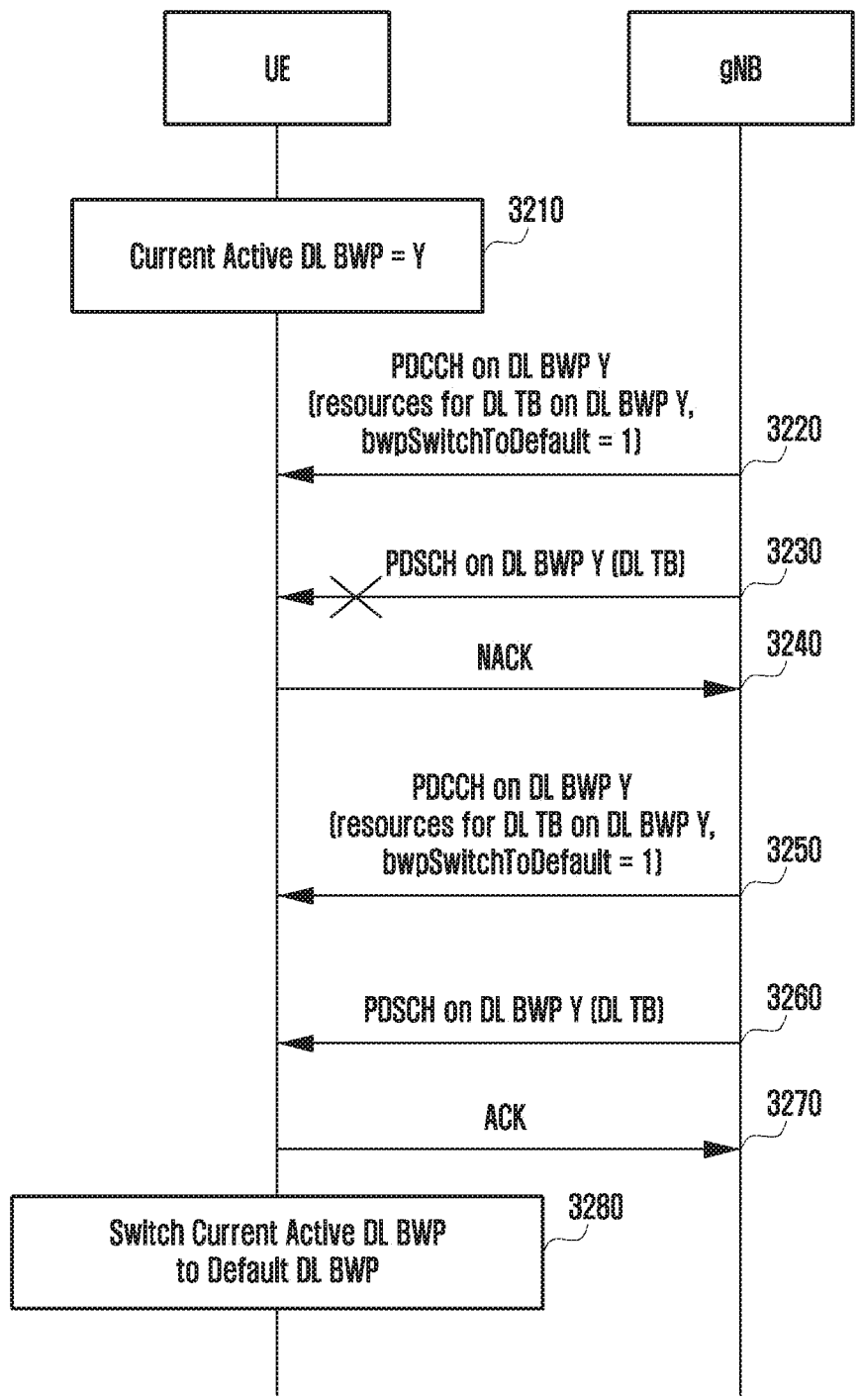

Referring to FIG. 32, the UE's current active DL BWP is DL BWP Y at operation 3210. The UE receives DCI via a PDCCH addressed to it on active DL BWP Y where the DCI includes bwpSwitchToDefault indicator (set to 1) and resources on DL BWP Y for a DL TB at operation 3220. The UE monitors the PDSCH on DL BWP Y and fails to receive the scheduled DL TB at operation 3230. The UE transmits the HARQ NACK to gNB for the received DL TB at operation 3240. The UE does not switch to default DL BWP. The UE further receives DCI via another PDCCH addressed to it on active DL BWP Y where the DCI includes bwpSwitchToDefault indicator (set to 1) and resources on DL BWP Y for a DL TB at operation 3250. The UE monitors the PDSCH on DL BWP Y and successfully receives the scheduled DL TB at operation 3260. The UE transmits the HARQ ACK to gNB for the received DL TB at operation 3270 and switches to default DL BWP at operation 3280. Note that if default DL BWP is not configured, the UE switches to initial DL BWP.

In an embodiment in above method, upon receiving BWP switching to default indication via PDCCH, the UE switches to default BWP after all the ongoing HARQ processes on active DL BWP are completed.

Method 2:

In another method of the disclosure, a bwpSwitchToDefault indicator is included in DCI.

Figure 33:
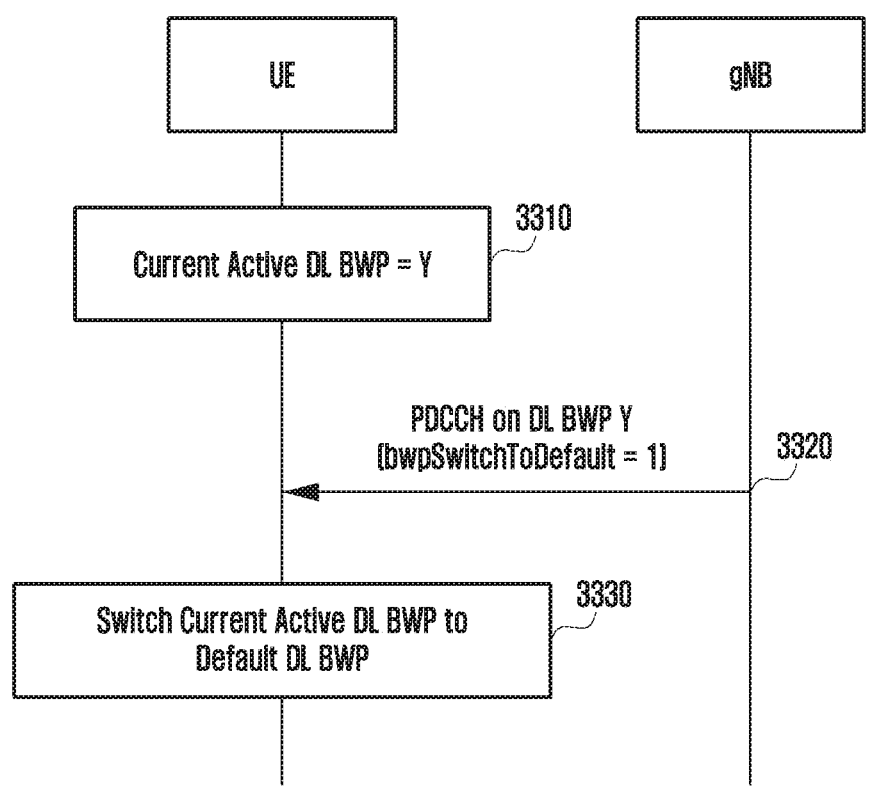
FIG. 33 is an example illustration of an embodiment according to an embodiment of the disclosure.

FIG. 33 is an example illustration of an embodiment according an embodiment of the disclosure.

Referring to FIG. 33, the UE's current active DL BWP is DL BWP Y at operation 3310. If the UE receives DCI via a PDCCH addressed to it wherein the DCI includes bwpSwitchToDefault indicator (set to 1) at operation 3320 and resources are not scheduled for TB in this DCI, the UE switches current active DL BWP to default DL BWP at operation 3330 upon receiving this PDCCH. Note that if default DL BWP is not configured, the UE switches to initial DL BWP. In an alternate embodiment, instead of bwpSwitchToDefault indicator, DCI type may indicate that DCI is for switching BWP to default.

In case of carrier aggregation, there can be more than one active serving cell in UE. In an embodiment, if the UE receives DCI via a PDCCH addressed to it on serving cell m wherein the DCI includes bwpSwitchToDefault indicator (set to 1), carrier index field indicates serving cell m, and resources for TB are not included in this DCI, the UE switches the active DL BWP of serving cell m to default DL BWP upon receiving this PDCCH. In another embodiment, if the UE receives DCI via a PDCCH addressed to it on serving cell m wherein the DCI includes bwpSwitchToDefault indicator (set to 1), carrier index field indicates serving cell n, and resources for TB are not included in this DCI, the UE switches the active DL BWP of serving cell n to default DL BWP upon receiving this PDCCH. In an embodiment, if the UE receives DCI via a PDCCH addressed to it on serving cell m wherein the DCI includes bwpSwitchToDefault indicator (set to 1), carrier index field is not present, and resources for TB are not included in this DCI, the UE switches the active DL BWP of serving cell m to default DL BWP upon receiving this PDCCH. In above embodiments, instead of bwpSwitchToDefault indicator, DCI type may indicate that DCI is for switching BWP to default. Note that if default DL BWP is not configured, the UE switches to initial DL BWP.

In an embodiment of above methods, upon receiving BWP switching to default indication via PDCCH, the UE switches to default BWP after all the ongoing HARQ processes on active DL BWP are completed.

Method 3:

In method 1 and method 2, bwpSwitchToDefault indicator in DCI a different C-RNTI (C-RNTI$_{bwpSwitchToDefault}$) can be configured for indicating BWP switching to default BWP. C-RNTI$_{bwpSwitchToDefault}$ is signaled by gNB in RRC reconfiguration message.

If the UE receives DCI via a PDCCH addressed to C-RNTI$_{bwpSwitchToDefault}$ including resources for DL TB, the UE switches to default DL BWP upon receiving the scheduled DL TB successfully (i.e. upon transmitting the HARQ ack for the scheduled TB).

In another embodiment, if the UE receives DCI via a PDCCH addressed to C-RNTI$_{bwpSwitchToDefault}$ on serving cell m wherein the DCI includes resources for DL TB of serving cell m, the UE switches the active DL BWP of serving cell m to default DL BWP upon receiving the scheduled DL TB successfully (i.e. upon transmitting the HARQ ack for the scheduled TB).

In another embodiment, if the UE receives DCI via a PDCCH addressed to C-RNTI$_{bwpSwitchToDefault}$ on serving cell m wherein the DCI includes resources for DL TB of serving cell n, the UE switches the active DL BWP of serving cell n to default DL BWP upon receiving the scheduled DL TB successfully (i.e. upon transmitting the HARQ ack for the scheduled TB).

In another embodiment, if the UE receives DCI via a PDCCH addressed to C-RNTI$_{bwpSwitchToDefault}$ and resources are not scheduled for TB, the UE switches to default DL BWP upon receiving this PDCCH.

In an embodiment, if the UE receives DCI via a PDCCH addressed to C-RNTI$_{bwpSwitchToDefault}$ on serving cell m wherein the DCI includes carrier index field indicates serving cell m, and resources for TB are not included, the UE switches the active DL BWP of serving cell m to default DL BWP upon receiving this PDCCH.

In another embodiment, if the UE receives DCI via a PDCCH addressed to C-RNTI$_{bwpSwitchToDefault}$ on serving cell m wherein the DCI includes carrier index field indicates serving cell n, and resources for TB are not included, the UE switches the active DL BWP of serving cell n to default DL BWP upon receiving this PDCCH.

In another embodiment, if the UE receives DCI via a PDCCH addressed to it on serving cell m wherein the DCI includes carrier index field is not present, and resources for TB are not included, the UE switches the active DL BWP of serving cell m to default DL BWP upon receiving this PDCCH.

In an embodiment of above methods, upon receiving BWP switching to default indication (as explained above), the UE switches to default BWP after all the ongoing HARQ processes on active DL BWP are completed.

Method 4:

In another method of the disclosure, gNB transmits a MAC control element (CE) to switch the active DL BWP to default DL BWP.

In an embodiment, bwpSwitchToDefault MAC CE has no contents. It has a fixed size of zero bits. The bwpSwitchToDefault MAC CE is identified by a MAC PDU subheader with a pre-defined logical channel ID (LCID). Upon receiving this MAC CE:

Option 1: UE switches the active DL BWP of each serving cell (of gNB from which this MAC CE is received) to default DL BWP.

Option 2: UE switches the active DL BWP of special cell (SpCell) (of gNB from which this MAC CE is received) to default DL BWP.

Option 3: UE switches the active DL BWP of each serving cell to default DL BWP.

In an embodiment, bwpSwitchToDefault MAC CE includes serving cell ID of serving cell to which this MAC CE applies. The bwpSwitchToDefault MAC CE is identified by a MAC PDU subheader with a pre-defined LCID. Upon receiving this MAC CE: UE switches the active DL BWP of serving cell identified by serving cell ID to default DL BWP. In an embodiment, multiple serving cell IDs can be included in MAC CE.

In an embodiment, bwpSwitchToDefault MAC CE includes one or more Ci fields. Each Ci field size is 1 bit. The bwpSwitchToDefault MAC CE is identified by a MAC PDU subheader with a pre-defined LCID. Upon receiving this MAC CE: if a Ci field is set to 1, the UE switches the active DL BWP of serving cell corresponding to this Ci field to default DL BWP. The $C_i$ field with i=0 corresponds to PCell. The $C_i$ field for i>0 corresponds to serving cell with SCellIndex i. SCellIndex is signaled by gNB for every SCell and primary SCell (PSCell) in RRC reconfiguration message.

In an embodiment, upon receiving indication to switch to default DL BWP of a serving cell, the UE switches to default BWP after all the ongoing HARQ processes on active DL BWP are completed.

Note that in all the above methods if default DL BWP is not configured UE switches to initial DL BWP instead of default DL BWP.

In an embodiment, if the UE receives indication to switch to default BWP of a serving cell while RA procedure is ongoing associated with that serving cell, the UE shall ignore the indication to switch. In another embodiment, if the UE receives indication to switch to default BWP of a serving cell while BWP inactivity timer is not running, the UE shall ignore the indication to switch.

Figure 34:
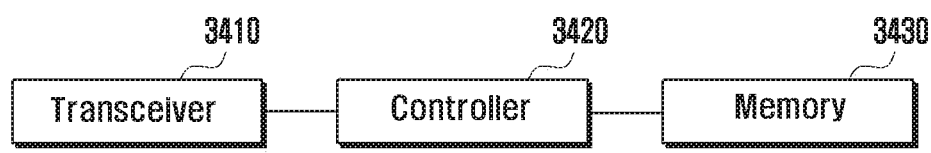
FIG. 34 is a block diagram of a terminal according to an embodiment of the disclosure.

FIG. 34 is a block diagram of a terminal according to an embodiment of the disclosure.

Referring to FIG. 34, a terminal includes a transceiver 3410, a controller 3420 and a memory 3430. The controller 3420 may refer to a circuitry, an ASIC, an FPGA, or at least one processor. The transceiver 3410, the controller 3420 and the memory 3430 are configured to perform the operations of the UE illustrated in the figures, e.g. FIGS. 1 to 33, or as otherwise described above. Although the transceiver 3410, the controller 3420 and the memory 3430 are shown as separate entities, they may be integrated onto a single chip. The transceiver 3410, the controller 3420 and the memory 3430 may also be electrically connected to or coupled with each other.

The transceiver 3410 may transmit and receive signals to and from other network entities, e.g., a base station.

The controller 3420 may control the UE to perform functions according to the embodiments described above. For example, the controller 3420 is configured to transmit a random access preamble (i.e., Msg1) to a base station via the transceiver 3410, monitor RAR window to receive an RAR from base station via the transceiver 3410. As described in Method 14, the plurality of MAC subPDUs may include a RAPID corresponding to the random access preamble. The controller 3420 is configured to identify whether each MAC subPDU in the received RAR includes the RAPID corresponding to the random access preamble. The controller 3420 may be configured to continue to process the received RAR until the terminal finds a MAC subPDU which does not correspond to the random access preamble or there are no more MAC subPDUs in the received RAR. The RAR may include an UL grant. As described in Methods 1 to 4, the UL grant may include information indicating at least one slot in which PUSCH resources are allocated for transmitting a Msg 3 (e.g., duration in slots, slot bitmap, offset). As described in Methods 5 to 10, the UL grant may include information indicating at least one symbol allocated for transmitting a Msg3 (e.g. offset in symbols, symbol bitmap). As described in Methods 11 to 13, the UL grant may include information on a list of PUSCH resources allocated for transmitting Msg 3 (e.g., a list of start symbol and length, Msg3 PUSCH time resource allocation list, Msg3 PUSCH frequency resource allocation list). As described in Method 14, the UL grant may include a BWP bitmap.

In an embodiment, the operations of the terminal may be implemented using the memory 3430 storing corresponding program codes. Specifically, the terminal may be equipped with the memory 3430 to store program codes implementing desired operations. To perform the desired operations, the controller 3420 may read and execute the program codes stored in the memory 3430 by using a processor or a central processing unit (CPU).

Figure 35:
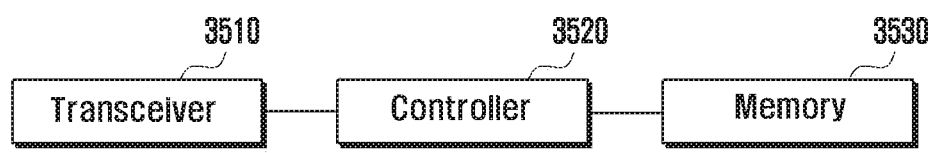
FIG. 35 is a block diagram of a base station according to an embodiment of the disclosure.

FIG. 35 is a block diagram of a base station according to an embodiment of the disclosure.

Referring to FIG. 35, a base station includes a transceiver 3510, a controller 3520 and a memory 3530. The controller 3520 may refer to a circuitry, an ASIC, an FPGA, or at least one processor. The transceiver 3510, the controller 3520 and the memory 3530 are configured to perform the operations of the gNB illustrated in the figures, e.g. FIGS. 1 to 33, or as otherwise described above. Although the transceiver 3510, the controller 3520 and the memory 3530 are shown as separate entities, they may be integrated onto a single chip. The transceiver 3510, the controller 3520 and the memory 3530 may also be electrically connected to or coupled with each other.

The transceiver 3510 may transmit and receive signals to and from other network entities, e.g., a terminal.

The controller 3520 may control the gNB to perform functions according to the embodiments described above. For example, the controller 3520 is configured to receive a random access preamble from a terminal via the transceiver, generate an RAR including a plurality of MAC subPDUs, and transmit the generate RAR to the terminal via the transceiver. The controller 3520 may be configured to multiplex the plurality of MAC subPDUs including the RAPID corresponding to the random access preamble. The controller 3520 may be configured to include the RAPID corresponding to the random access preamble transmitted in unlicensed carrier in the plurality of MAC subPDUs.

In an embodiment, the operations of the base station may be implemented using the memory 3530 storing corresponding program codes. Specifically, the base station may be equipped with the memory 3530 to store program codes implementing desired operations. To perform the desired operations, the controller 3520 may read and execute the program codes stored in the memory 3530 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a terminal for performing a random access procedure in an unlicensed carrier, the method comprising:

transmitting, to a base station, a random access preamble;

receiving, from the base station, a random access response (RAR) including a plurality of media access control (MAC) sub-protocol data units (subPDUs), wherein at least one MAC subPDU among the plurality of MAC subPDUs includes a same random access preamble identifier (RAPID) corresponding to the transmitted random access preamble; and identifying whether each MAC subPDU in the received RAR includes the same RAPID corresponding to the transmitted random access preamble.

2. The method of claim 1, wherein the identifying is performed until the terminal finds a MAC subPDU which does not correspond to the transmitted random access preamble or there are no more MAC subPDUs in the received RAR.

3. The method of claim 1, wherein the at least one MAC subPDU including the same RAPID corresponding to the transmitted random access preamble is multiplexed one after another subPDU in the RAR.

4. The method of claim 1, wherein the RAR comprises an uplink (UL) grant, and wherein the UL grant comprises information indicating at least one slot in which physical uplink shared channel (PUSCH) resources are allocated for transmitting a message 3 (Msg3).

5. The method of claim 1, wherein the RAR comprises an uplink (UL) grant, and wherein the UL grant comprises information indicating at least one symbol allocated for transmitting a message 3 (Msg3).

6. The method of claim 1, wherein the RAR comprises an uplink (UL) grant, and wherein the UL grant comprises information on a list of physical uplink shared channel (PUSCH) resources allocated for transmitting a message 3 (Msg3).

7. A terminal in a wireless communication system, the terminal comprising:

a transceiver; and at least one processor coupled with the transceiver and configured to:

transmit, to a base station via the transceiver, a random access preamble, receive, from the base station via the transceiver, a random access response (RAR) including a plurality of media access control (MAC) sub-protocol data units (subPDUs), wherein at least one MAC subPDU among the plurality of MAC subPDUs includes a same random access preamble identifier (RAPID) corresponding to the transmitted random access preamble, and identify whether each MAC subPDU in the received RAR includes the same RAPID corresponding to the transmitted random access preamble.

8. The terminal of claim 7, wherein the at least one processor is further configured to continue to process the received RAR until the terminal finds a MAC subPDU which does not correspond to the transmitted random access preamble or there are no more MAC subPDUs in the received RAR.

9. The terminal of claim 7, wherein the RAR comprises an uplink (UL) grant, and wherein the UL grant comprises information indicating at least one slot in which physical uplink shared channel (PUSCH) resources are allocated for transmitting a message 3 (Msg3).

10. The terminal of claim 7, wherein the RAR comprises an uplink (UL) grant, and wherein the UL grant comprises information indicating at least one symbol allocated for transmitting a message 3 (Msg3).

11. The terminal of claim 7, wherein the RAR comprises an uplink (UL) grant, and wherein the UL grant comprises information on a list of physical uplink shared channel (PUSCH) resources allocated for transmitting a message 3 (Msg3).

12. A method of a base station for performing a random access procedure in an unlicensed carrier, comprising:

receiving, from a terminal, a random access preamble;

generating a random access response (RAR) including a plurality of media access control (MAC) sub-protocol data units (subPDUs), wherein at least one MAC sub-PDU among the plurality of MAC subPDUs includes a same random access preamble identifier (RAPID) corresponding to the received random access preamble; and transmitting, to the terminal, the generated RAR.

13. The method of claim 12, wherein the generating of the RAR comprises multiplexing the at least one MAC subPDU including the same RAPID corresponding to the received random access preamble.

14. The method of claim 12, wherein the RAR comprises an uplink (UL) grant, and wherein the UL grant comprises information indicating at least one slot in which physical uplink shared channel (PUSCH) resources are allocated for transmitting a message 3 (Msg3).

15. The method of claim 12, wherein the RAR comprises an uplink (UL) grant, and wherein the UL grant comprises information indicating at least one symbol allocated for transmitting a message 3 (Msg3).

16. A base station in a wireless communication system, comprising:

a transceiver; and at least one processor coupled with the transceiver and configured to:

receive, from a terminal via the transceiver, a random access preamble, generate a random access response (RAR) including a plurality of media access control (MAC) sub-protocol data units (subPDUs), wherein at least one MAC subPDU among the plurality of MAC subPDUs includes a same random access preamble identifier (RAPID) corresponding to the received random access preamble; and transmit, to the terminal via the transceiver, the generated RAR.

17. The base station of claim 16, wherein the at least one processor is further configured to multiplex the at least one MAC subPDU including the same RAPID corresponding to the received random access preamble.

18. The base station of claim 16, wherein the RAR comprises an uplink (UL) grant, and wherein the UL grant comprises information indicating at least one slot in which physical uplink shared channel (PUSCH) resources are allocated for transmitting a message 3 (Msg3).

\* \* \* \* \*